(12) United States Patent
Lopez et al.

(10) Patent No.: US 11,507,912 B1
(45) Date of Patent: Nov. 22, 2022

(54) AERIAL ITEM DELIVERY AVAILABILITY

(71) Applicant: Amazon Technologies, Inc., Seattle, WA (US)

(72) Inventors: Javier Alonso Lopez, Edmonds, WA (US); Pragyana K. Mishra, Seattle, WA (US); Ben Shapiro, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 766 days.

(21) Appl. No.: 16/447,597

(22) Filed: Jun. 20, 2019

(51) Int. Cl.
*G06Q 10/08* (2012.01)
*G06F 16/2457* (2019.01)
*G08G 5/00* (2006.01)
*G06F 16/29* (2019.01)
*G06V 10/50* (2022.01)

(52) U.S. Cl.
CPC ... *G06Q 10/0832* (2013.01); *G06F 16/24578* (2019.01); *G06F 16/29* (2019.01); *G06V 10/50* (2022.01); *G08G 5/0069* (2013.01)

(58) Field of Classification Search
CPC .......... G06Q 10/0832; G06F 16/24578; G06F 16/29; G06V 10/50; G08G 5/0069
USPC ........................................................ 705/332
See application file for complete search history.

(56) References Cited

U.S. PATENT DOCUMENTS

| 7,912,880 | B2* | 3/2011 | Klein | G06Q 30/0601 |
| | | | | 701/533 |
| 9,743,239 | B1 | 8/2017 | Mishra | |
| 10,219,112 | B1 | 2/2019 | Mishra | |
| 10,482,418 | B2 | 11/2019 | Burch et al. | |
| 2003/0158668 | A1* | 8/2003 | Anderson | G06T 17/05 |
| | | | | 702/5 |
| 2013/0004179 | A1* | 1/2013 | Nielsen | H04B 10/1143 |
| | | | | 398/115 |
| 2017/0154347 | A1 | 6/2017 | Bateman | |
| 2018/0005184 | A1 | 1/2018 | Schenken | |
| 2018/0088578 | A1 | 3/2018 | Burch et al. | |

* cited by examiner

*Primary Examiner* — Gertrude Arthur Jeanglaude
(74) *Attorney, Agent, or Firm* — Athorus, PLLC

(57) ABSTRACT

Disclosed are systems and methods to determine and rank large areas encompassing many parcels (e.g., neighborhoods, cities, towns) for aerial item delivery availability, without the use of image data of the areas. In some implementations, publicly available two-dimensional parcel maps that indicate parcel boundaries and outlines of structures on those parcels may be obtained and processed. For example, parcels within the area may be processed to determine deliverable area shapes, such as rectangles, within the parcel, excluding the area of the structure. A determination is then made as to whether one or more of the deliverable area shapes exceed a deliverable area threshold. If one or more of the deliverable area shapes of the parcel exceed the threshold, the parcel is considered to be available for aerial item delivery. This processing may be done for all parcels within an area or all customer parcels of customers of a service within the area (or any other selection criteria). Likewise, this processing may be done for multiple different areas and the areas may be ranked based on the overall determined availability of aerial item delivery to parcels within those areas.

20 Claims, 18 Drawing Sheets

AERIAL ITEM DELIVERY AVAILABILITY

BACKGROUND

Unmanned Aerial Systems (UAS) need a minimum space that is clear and accessible for landing and/or takeoff. In unfamiliar areas, delineating this space requires a mapping method that either uses 2D imagery, 3D models, or a combination of both to ascertain potential locations that are clear and accessible. These techniques, which often use three-dimensional point-clouds or mesh models, are computationally expensive and data intensive. Plus, valuable flight time may be consumed by the UAS as it images an area and processes those images in search for a clear and accessible area to land.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims.

DETAILED DESCRIPTION

Systems and methods to determine and rank large areas encompassing many parcels (e.g., neighborhoods, cities, towns) for aerial item delivery availability, without the use of image data of the areas, are disclosed. In some implementations, publicly available two-dimensional parcel maps that indicate parcel boundaries and outlines of structures on those boundaries may be obtained and processed. For example, parcels within the area may be processed to determine deliverable area shapes (e.g., squares, rectangles, circles, ellipses, etc.) within the parcel, excluding the area of the structure. A determination is then made as to whether one or more of the deliverable area shapes exceed a deliverable area threshold. If one or more of the deliverable area shapes of the parcel exceed the threshold, the parcel is considered to be available for aerial item delivery. This processing may be done for all parcels within an area, or all customer parcels of customers of a service within the area (or any other selection criteria). Likewise, this processing may be done for multiple different areas and the areas may be ranked based on the overall determined availability of aerial item delivery to parcels within those areas.

Ranking areas with respect to overall determined availability of aerial item delivery to parcels may be beneficial in, for example, deployment planning to identify new areas to provide aerial item delivery services, planning for mobile deployment locations to position vehicles to deploy aerial vehicles for item delivery to areas, future fulfillment center location planning, etc.

In addition to determining availability of aerial item delivery for areas, the parcel processing may likewise be used to determine delivery points for aerial item delivery to the parcel, in accordance with disclosed implementations. For example, aerial image data of a parcel may be obtained but only portions of the image data processed. Specifically, image data corresponding to the location of the structure and portions of the parcel that are determined to not be within a deliverable area shapes that is larger than the threshold may be excluded from processing. As a result, only image data corresponding to portions of the parcel that are potentially available for aerial item delivery are processed. This reduces the computation time required to determine a delivery point at the parcel for aerial item delivery.

Figure 1:
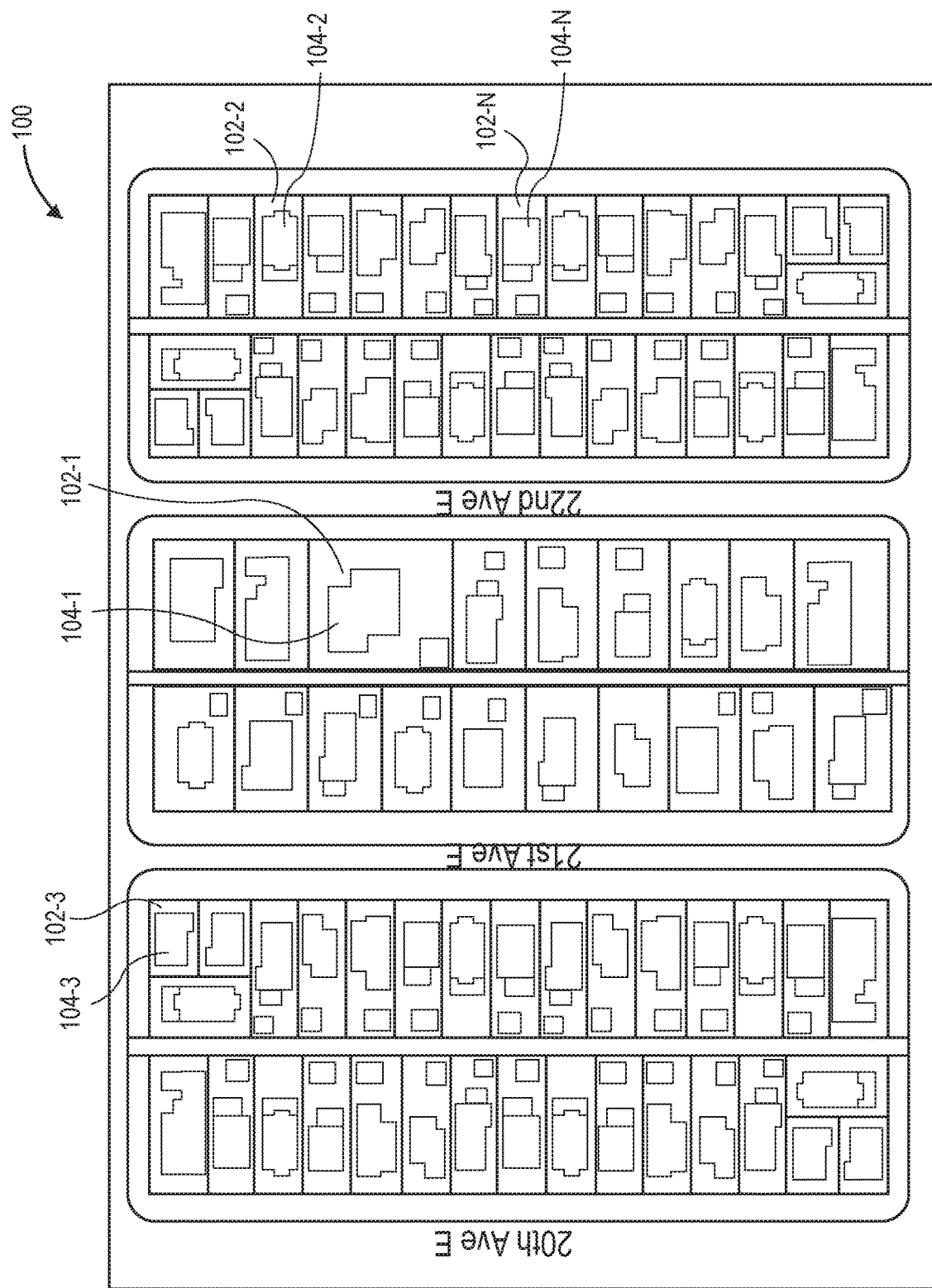
FIG. 1 is a diagram of a parcel map of an area indicating parcel boundaries and structure footprints on parcels.

FIG. 1 is a diagram of a two-dimensional ("2D") parcel map 100 of an area indicating parcel boundaries and structure footprints on parcels. Parcel maps are publicly accessible records that specify parcel 102 boundaries and the outline or footprint of structures 104 on those parcels. The parcel maps 100 are vector based and often include latitude and longitude information for the parcel boundaries and structure footprints.

In the example parcel map 100, the area includes several parcels, such as parcels 102-1, 102-2, 102-3 through 102-N and each of the parcels include a structure, such as structure 104-1, 104-2, 104-3 through 104-N. As illustrated, the parcels 102 may be of different sizes and shapes and the structures 104 on those parcels may likewise be of different sizes, shapes, and positions on each parcel. However, each parcel and each structure is a polygon that can be quantified and measured from the parcel map. As discussed herein, each parcel may be processed based on the parcel dimensions and the structure dimensions to determine whether the parcel is potentially available for aerial item delivery.

Figure 2:
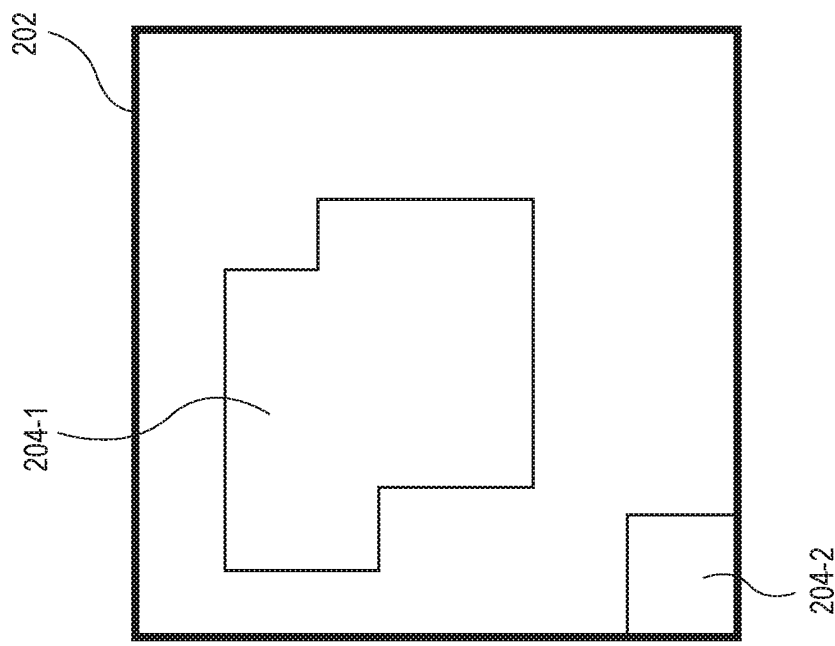
FIG. 2 is a diagram of a parcel polygon with structure footprints of the structures located at the parcel.

FIG. 2 is a diagram of a parcel polygon 202, which corresponds to parcel 102-1 of FIG. 1, with structure footprints 204-1 and 204-2 of the structures located at the parcel 202. As illustrated, the entire parcel and structures are represented in 2D form in the shape of polygons that have latitude and longitude (or any other projection/coordinate frame) accessible from the publicly accessible parcel map.

Figure 3:
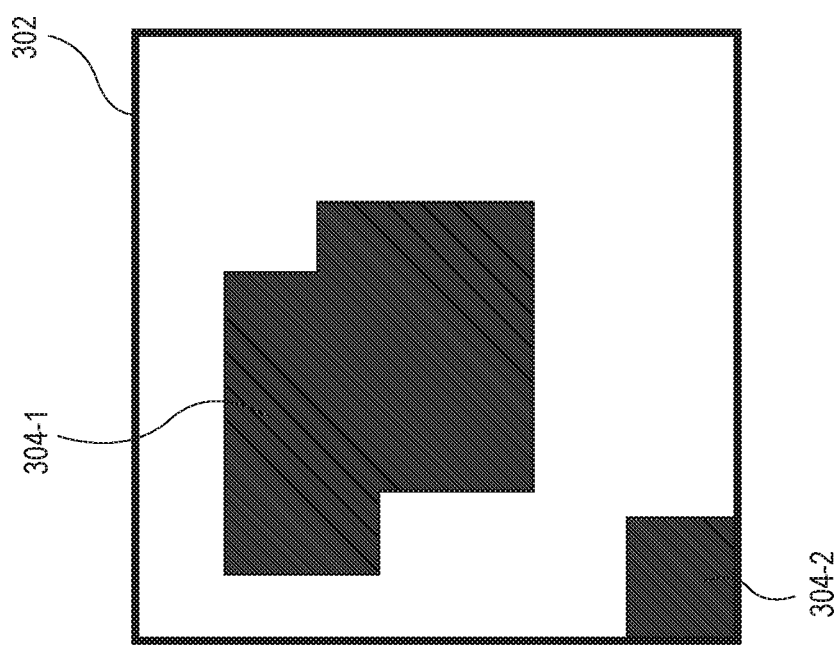
FIG. 3 is a diagram of a remaining parcel polygon with the footprint of the structure removed from consideration, in accordance with described implementations.

To determine the availability of the parcel for aerial item delivery, the polygon(s) representing the footprint of structure(s) at the parcel are removed from consideration. For example, FIG. 3 is a diagram of a remaining parcel polygon 302, which corresponds to parcel polygon 202 of FIG. 2, with the footprint of the structures 304-1 and 304-2 removed from consideration, in accordance with described implementations. The portions of the remaining parcel polygon 302 corresponding to the structures 304, in the disclosed implementations are removed because aerial delivery onto those structures is not an available option for the area. However, it will be appreciated that in some implementations, some or all of a structure 304 may be included in the remaining parcel polygon 304 and considered when determining if the parcel is available for aerial item delivery.

Figure 4B:
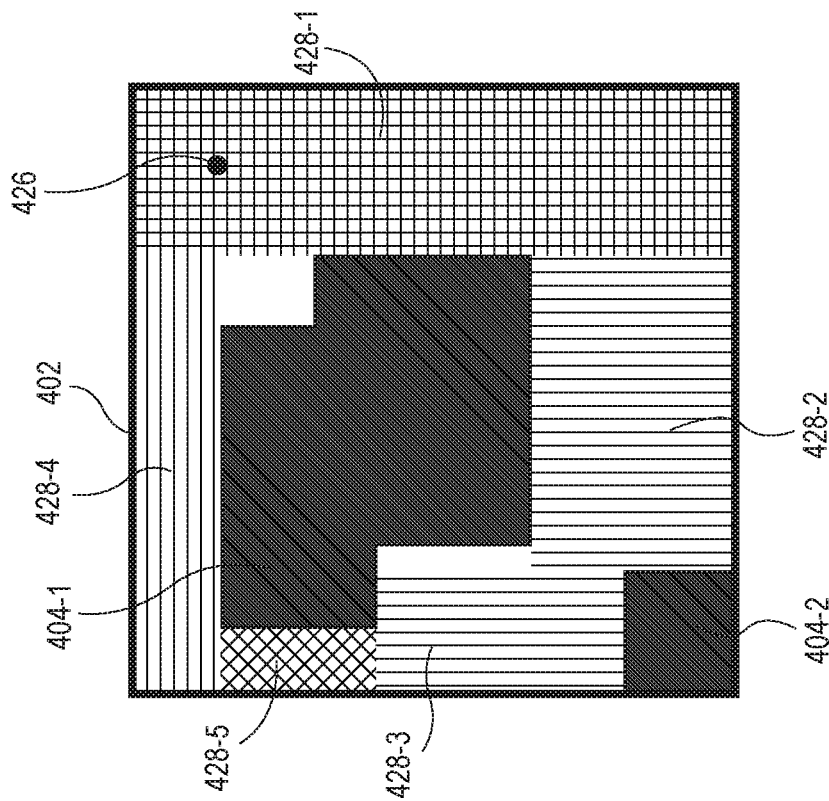
FIGS. 4A and 4B are diagrams of the remaining parcel polygon with the footprint removed and deliverable area shapes determined, in accordance with described implementations.

With the reduced parcel polygon, the disclosed implementations determine the largest possible shape (such as a rectangle, circle, ellipse) that can be inscribed within the remaining parcel polygon. For example, FIGS. 4A and 4B are diagrams of the remaining parcel polygon 402, which corresponds to the remaining parcel polygon 302 of FIG. 3, with the footprint of the structures 404-1, 404-2 removed and deliverable area shapes 408/428 in the form of rectangles determined, in accordance with described implementations.

In some implementations, one or more starting points 406/426 are selected within the remaining parcel polygon 402 from which shapes are to be formed. The starting points may be randomly selected or determined by other techniques. Once a starting point is specified, the disclosed implementations generate the largest possible shape, in this example a rectangle, starting at the starting point and extending such that the rectangle encompasses as much as possible of the remaining parcel polygon 402. For example, referring to FIG. 4A, a first rectangle 408-1 formed from starting point 406 is generated.

Figure 4A:
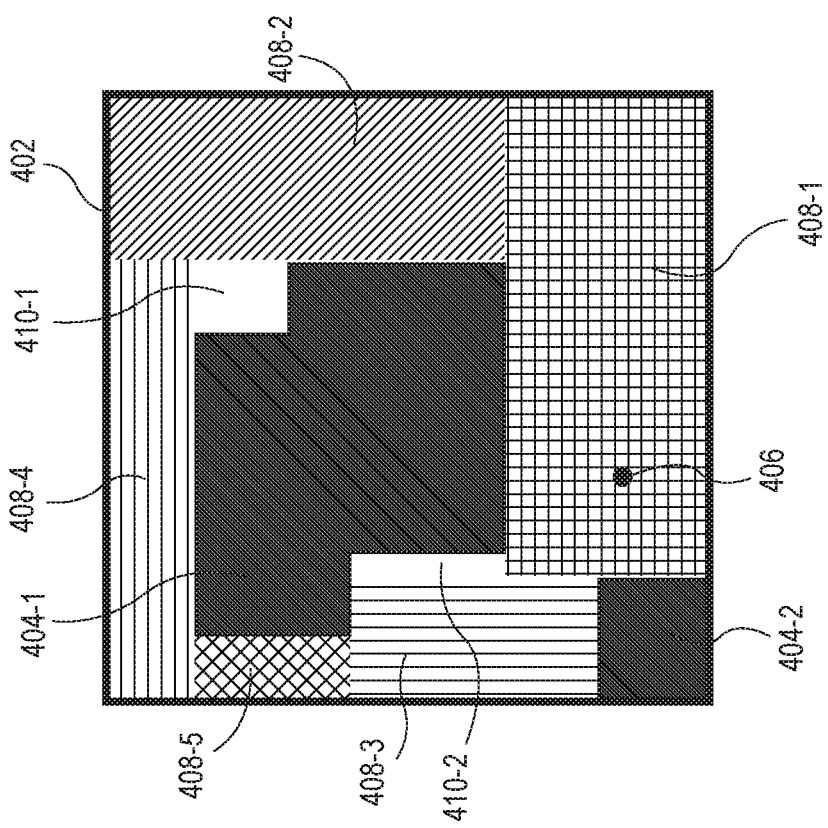

In the example illustrated in FIG. 4A, after forming the first rectangle 408-1, the disclosed implementations generate the next largest rectangle 408-2 within the remaining parcel polygon 402 such that the next largest rectangle 408-2 remains within the polygon 402, does not expand into the removed portion of the area corresponding to the footprint 404-1, 404-2 of the structure and does not overlap any portion of any other formed rectangle, such as rectangle 408-1. This process may continue and form additional rectangles 408-3, 408-4, 408-5 until the rectangles reach a size that does not exceed a deliverable area threshold.

In the example illustrated in FIG. 4A, five rectangles are formed 408-1, 408-2, 408-3, 408-4, and 408-5 that exceed the minimum deliverable area threshold. As illustrated, there may remain portions of the remaining parcel polygon 402, such as portions 410-1, 410-2, that are not included in any rectangle. As discussed further below, in some implementations those portions may be excluded from consideration as areas that are not available for aerial item delivery because they do not meet the minimum size requirement.

Comparing FIG. 4A to FIG. 4B, the process may be performed for each of several randomly selected starting points. Starting at different starting points 406/426 may result in different rectangle configurations, as illustrated. For example, the largest deliverable area shape 428-1 is different than the largest deliverable area shape 408-1 of FIG. 4A, even though the parcel 402 remains unchanged. Likewise, the two second largest deliverable area shapes 408-2 and 428-2 are different. In comparison, deliverable area shapes 408-3, 408-4, and 408-5 are the same as deliverable area shapes 428-3, 428-4, and 428-5. The difference between some of the deliverable area shapes is the result of the different starting points 406 and 426.

FIGS. 5A through 5D are diagrams of the reduced parcel polygon 502, which corresponds to parcel polygon 302 of FIG. 3, with the footprint of the structures 504-1/504-2 removed and deliverable area shapes, in this example in the form of rectangles 508 determined, in accordance with described implementations. In this example, referring first to FIG. 5A, a first starting point 506-1 is randomly selected from the area of the remaining parcel polygon 502 and a rectangle 508-1 formed as large as possible from that area such that the rectangle 508-1 contacts at least one edge of the remaining parcel polygon 502 and at least one edge of the first portion of the area 504-1 that was removed.

Figure 5A:
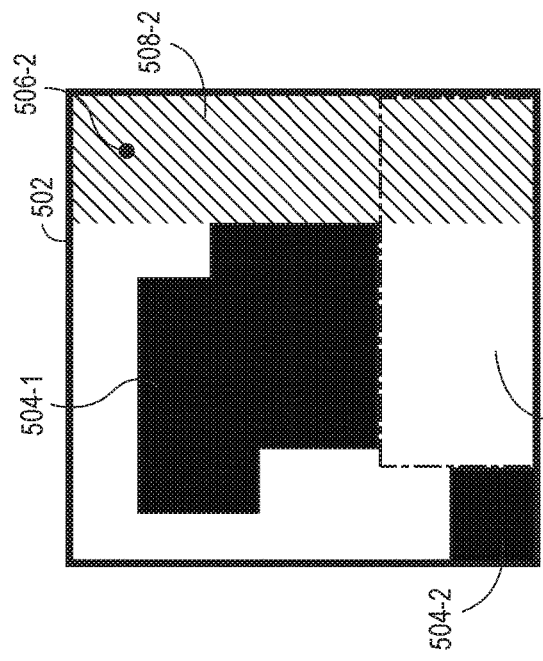
FIGS. 5A through 5D are diagrams of the remaining parcel polygon with the footprint removed and deliverable area shapes determined, in accordance with described implementations.
Figure 5B:
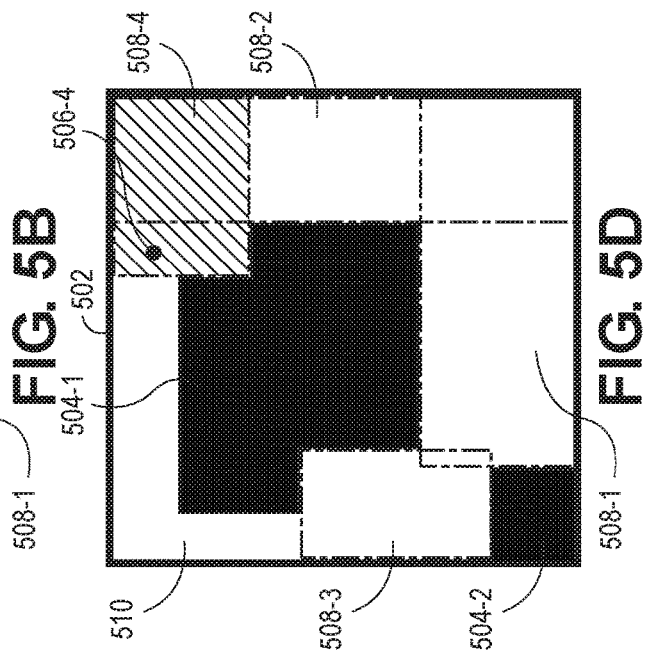

After forming the first rectangle, a reduced remaining parcel polygon is generated from the remaining parcel polygon 502 by removing the portion of remaining parcel polygon encompassed by the rectangle 508-1. Referring to FIG. 5B, a second starting point 506-2 is randomly selected from within the area of the reduced remaining parcel polygon. From the second starting point, another largest rectangle 508-2 is formed. Contrary to the prior examples, in this example, the formed deliverable area shapes may overlap some or all of another formed deliverable area shape. For example, in FIG. 5B the first deliverable area shape 508-1 is overlapped by the second deliverable area shape 508-2.

Figure 5C:
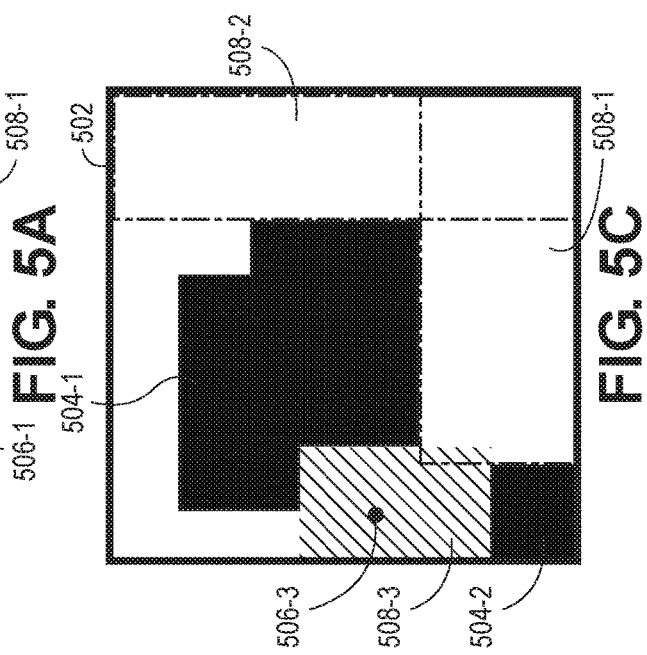

The reduced remaining parcel polygon may then be again further reduced to remove the portion corresponding to the second rectangle 508-2. Referring now to FIG. 5C, a third starting point 506-3 may be randomly or otherwise selected from the reduced remaining parcel polygon and a third deliverable area shape 508-3 formed which, as with the others, may overlap one or more other formed deliverable area shapes, such as deliverable area shape 508-1.

Figure 5D:
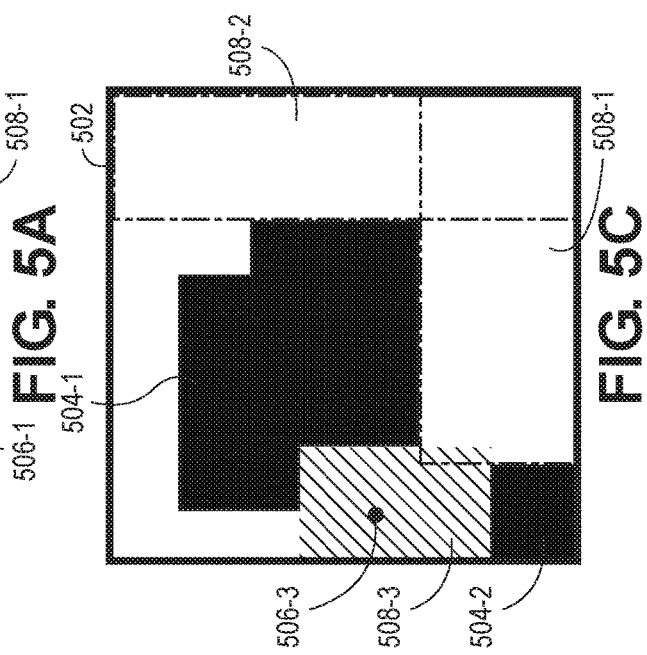

This process of continuing to reduce the reduced remaining parcel polygon, selecting a starting point from within the reduced remaining parcel polygon and then creating a rectangle from that starting point that is within the remaining parcel polygon may continue, as illustrated in FIG. 5D with the selection of a fourth starting point 506-4 and a fourth rectangle 508-4, may continue until a defined number of deliverable area shapes have been formed (e.g., 5, 10) or until a minimum rectangle size (e.g., 1 meter by 1 meter) is reached, or the entire area of the remaining parcel polygon is encompassed by one or more deliverable area shapes.

In the example illustrated in FIGS. 5A through 5D, the remaining parcel polygon is processed and deliverable area shapes 508-1 through 508-5, in the form of rectangles, formed until a minimum deliverable area shape size is formed. As a result, area 510 is not encompassed by a deliverable area shape and may be considered to not be an area that is available for aerial item delivery.

Figure 6:
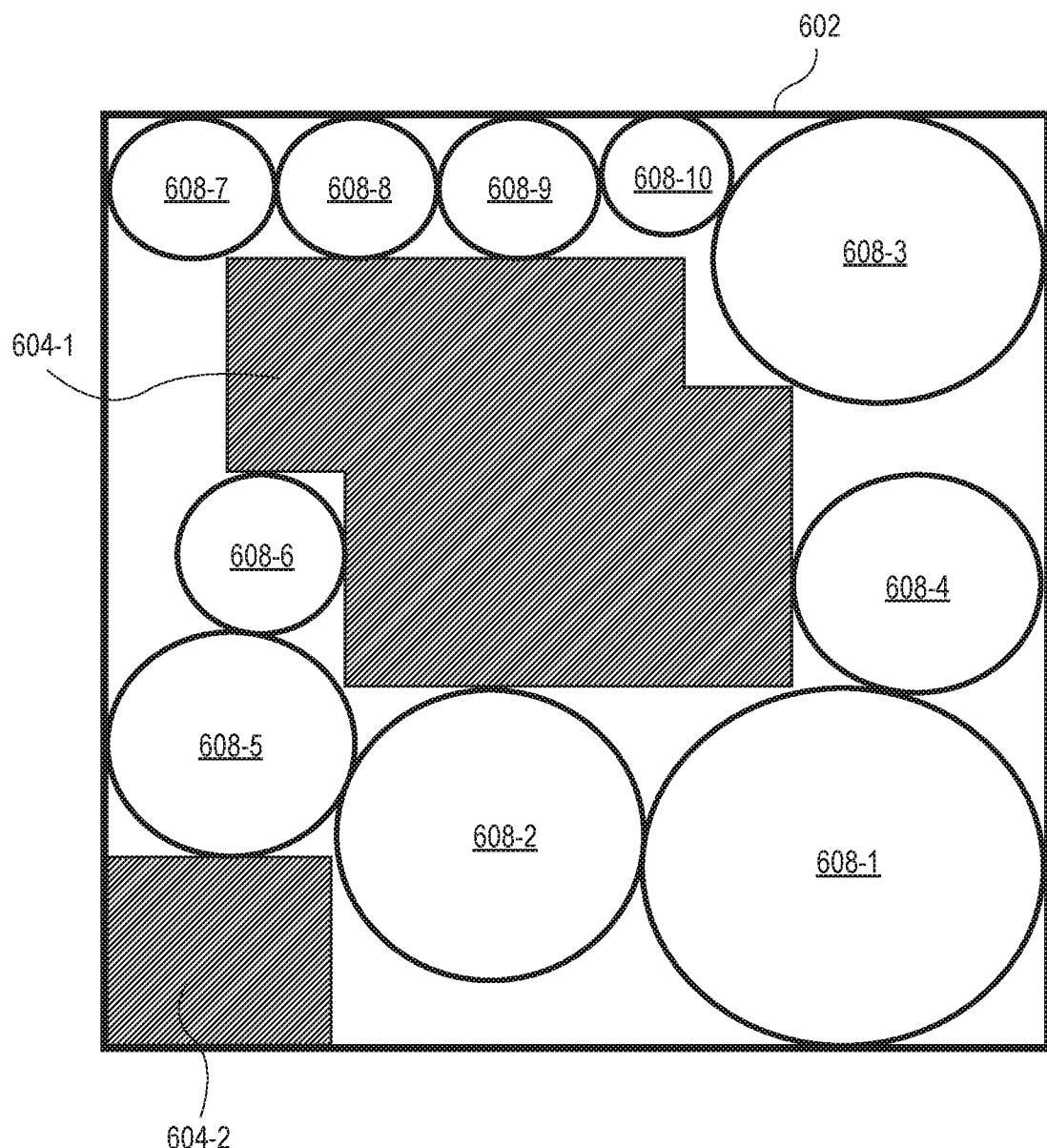
FIG. 6 is a diagram of the remaining parcel polygon with the footprint removed and deliverable area shapes determined, in accordance with described implementations.

FIG. 6 is a diagram of the remaining parcel polygon 602 with the footprint of the structures 604-1 and 604-2 removed and deliverable area shapes 608-1, 608-2, 608-3, 608-4, 608-5, 608-6, 608-7, 608-9, 608-10, in the form circles determined, in accordance with described implementations. In the illustrated example, similar to the discussion with respect to FIGS. 4A and 4B, the deliverable area shapes 608 are formed as large as possible but have the constraints that they not expand beyond the remaining parcel polygon 602, not encroach into the removed portions 604-1, 604-2, or overlap other already formed deliverable area shape. However, it will be appreciated, that in other implementations, the constrains may be changed such that the deliverable area shapes may be allowed to overlap. For example, if the deliverable area shapes are allowed to overlap, deliverable area shape 608-2 would be larger and overlap deliverable area shape 608-1. Likewise, deliverable area shape 608-10 would be larger and overlap deliverable area shape 608-3 and deliverable area shape 608-6 would be larger and overlap deliverable area shape 608-5.

Figure 7:
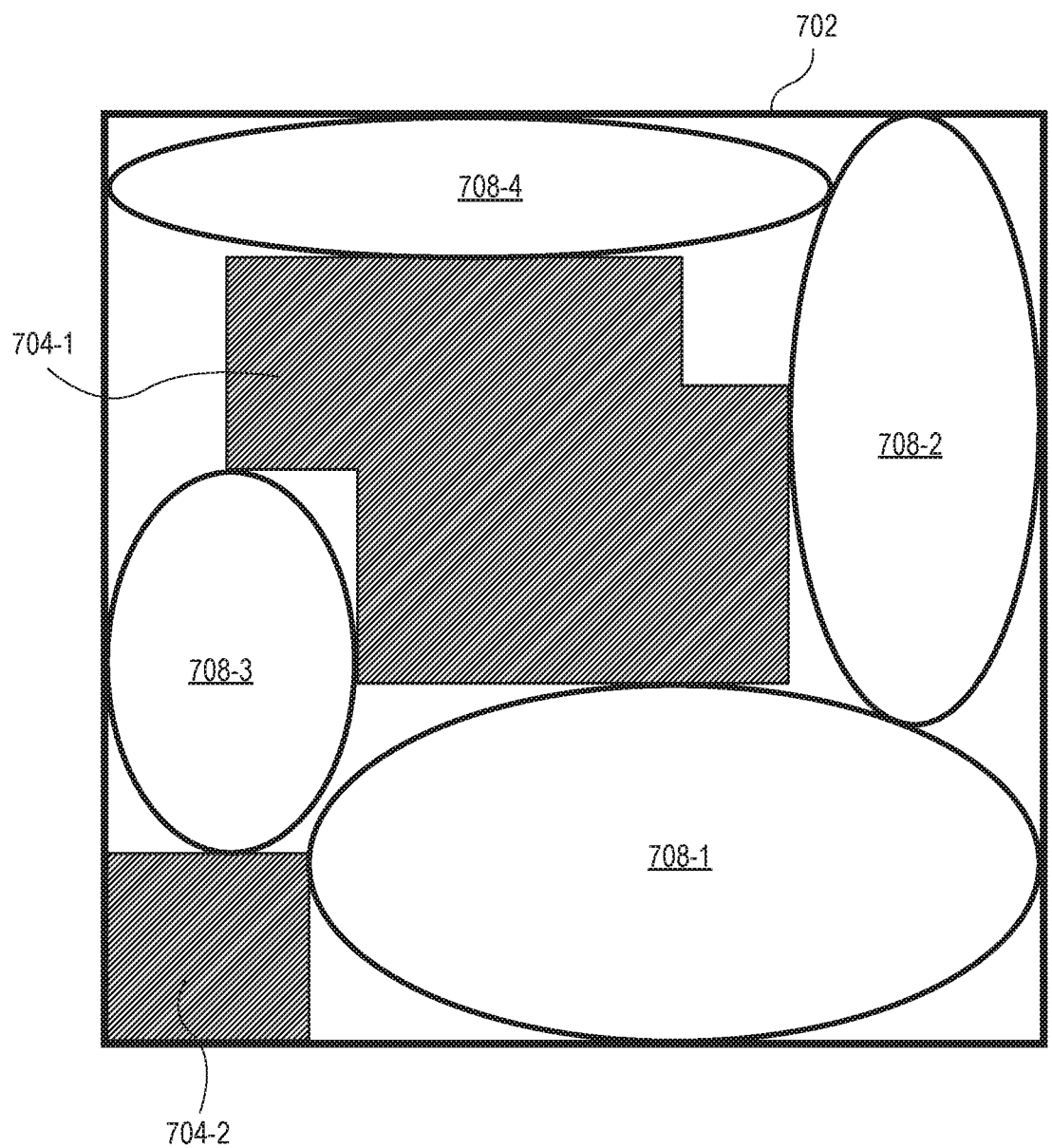
FIG. 7 is a diagram of the remaining parcel polygon with the footprint removed and deliverable area shapes determined, in accordance with described implementations.

FIG. 7 is a diagram of the remaining parcel polygon 702, which corresponds to remaining parcel polygon 302 of FIG. 3, with the footprint of the structures 704-1/704-2 removed and deliverable area shapes 708-1, 708-2, 708-3, 708-4, in the form of ellipses, determined, in accordance with described implementations. In the illustrated example, similar to the discussion with respect to FIGS. 4A, 4B, and 6, the deliverable area shapes 708 are formed as large as possible but have the constraints that they not expand beyond the remaining parcel polygon 602, not encroach into the removed portions 704-1, 704-2, or overlap other already formed deliverable area shapes. However, it will be appreciated, that in other implementations, the constrains may be changed such that the deliverable area shapes may be allowed to overlap. For example, if the deliverable area shapes are allowed to overlap, deliverable area shape 708-2 would be larger and overlap deliverable area shape 708-1. Likewise, deliverable area shape 708-4 would be larger and overlap deliverable area shape 708-2.

Regardless of the constraints applied to forming the deliverable area shapes and/or the shapes used (e.g., rectangles, circles, ellipses), if the one or more shapes formed for a parcel polygon is larger than a deliverable area threshold, the parcel is considered to be available for aerial item delivery. This may be done for each parcel within the area and an area score or ranking determined for the area.

Figure 8:
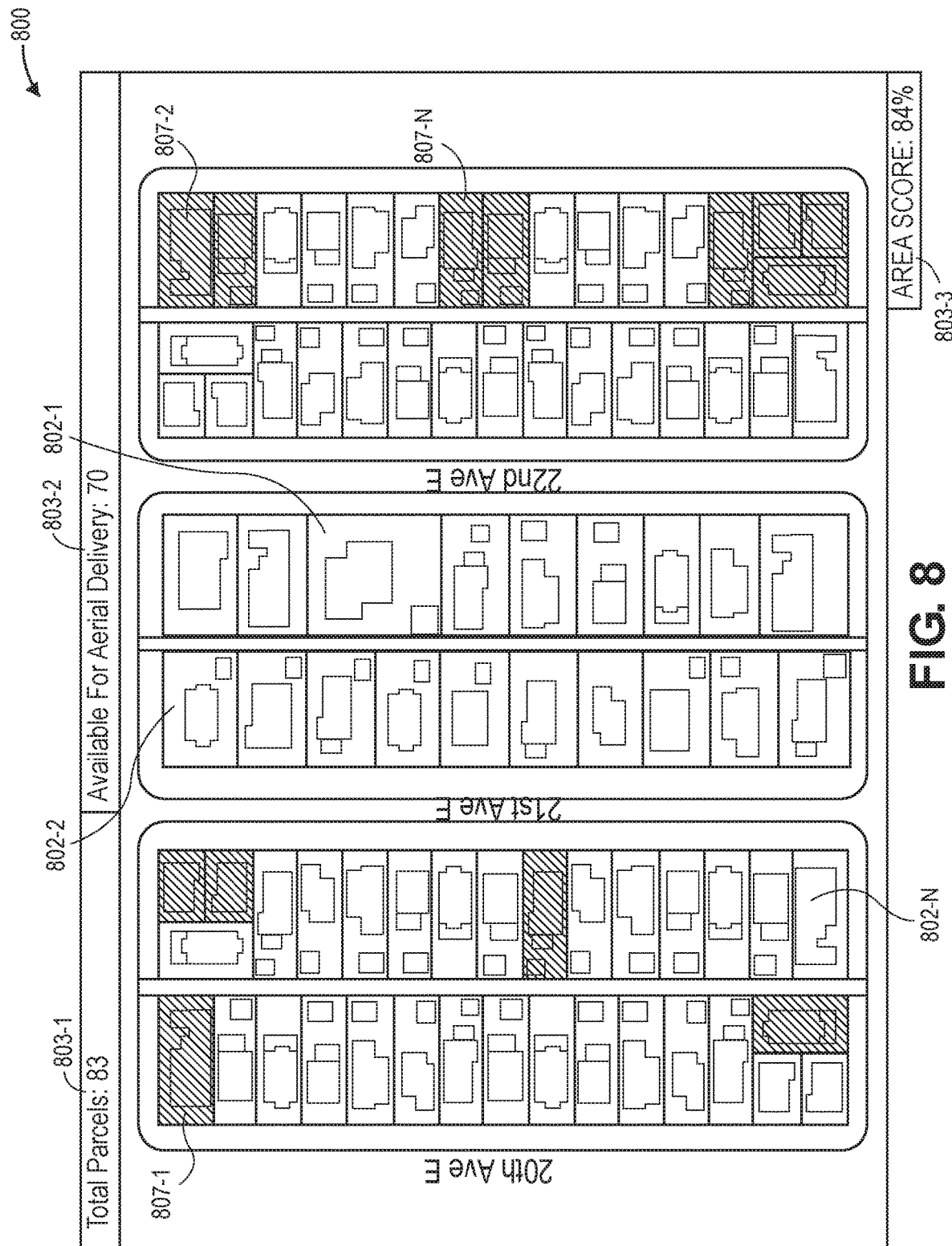
FIG. 8 is a graphical illustration of the parcel map of FIG. 1 with deliverability information for the area, in accordance with described implementations.

FIG. 8 is a graphical illustration 800 of the parcel map of FIG. 1 with deliverability information for the area, in accordance with described implementations. In the illustrated example, parcels 807-1, 807-2 through 807-N that are determined to not be available for aerial item delivery are greyed out or hatched, as illustrated, to visually indicate the parcels as not available for aerial item delivery. Likewise, an overall count 803-1 of parcels in the area, an available count 803-2 of parcels determined to be available for aerial item delivery, an area score 803-3 and/or other information relating to the area and the determined availability of parcels for aerial item delivery may be presented.

In the illustrated example, the described implementations determined that thirteen of the parcels 807-1, 807-2, through 807-N within area 800 are not available for aerial item delivery and that the other parcels 802-1, 802-2, through 802-N are available for aerial item delivery. In some implementations, as discussed further below, each parcel that is determined to be available for aerial item delivery may be assigned a parcel deliverability score. This information may be used for a variety of reasons. For example, the information about the area 800 may be used for deployment planning to identify new areas to provide aerial item delivery services, planning for mobile deployment locations to position vehicles to deploy aerial vehicles for item delivery to areas, future fulfillment center location planning, etc. For example, a weighted sum of parcel deliverability scores for parcels within the area may be computed as an overall area score indicating the confidence or availability of parcels within the area to receive aerial item deliveries. Area scores may be computed for multiple different areas, using the described implementations, and those area scores may be used to rank or prioritize different areas for aerial item delivery.

In addition to determining deliverability for an area, without having to process any image data, the disclosed implementations may also use the information generated for parcels to determine or rank deliverable area shapes within a parcel. For example, each deliverable area shape may be further processed, and a delivery rank assigned to each indicating a preference or order as to which deliverable area shape within the parcel should be processed first during an actual aerial item delivery to confirm an open and accessible area for aerial item delivery.

Figure 9:
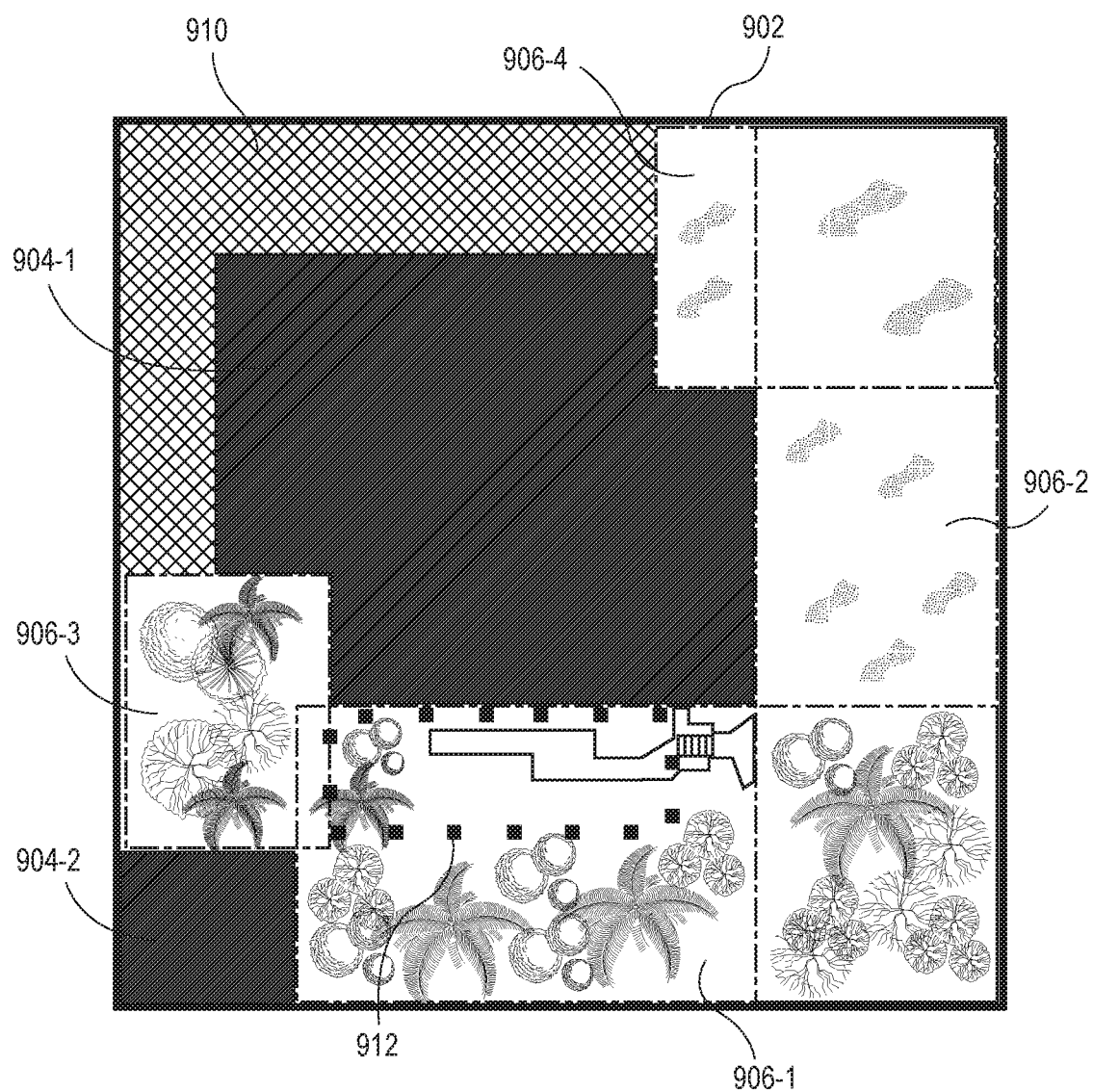
FIG. 9 is an image of the parcel, with image data corresponding to the footprint of the structure removed, in accordance with described implementations.

FIG. 9 is an image of the parcel 902, which corresponds to parcel 102 of FIG. 1, with image data corresponding the footprint of the structures 904-1/904-2 removed, in accordance with described implementations. In the illustrated example, in addition to removing image data corresponding to the footprint of the structures 904-1/904-2, image data for portions of the parcel, such as portion 910 that are not encompassed by one or more deliverable area shapes 906, may be removed from consideration. By removing image data from consideration that is not included in a deliverable area shape, the image processing is reduced, thereby increasing the speed at which deliverable area shapes can be ranked and/or the speed at which a delivery point within a deliverable area shape may be determined.

In the illustrated example, image data within deliverable area shape 906-1 is processed, image data within deliverable area shape 906-2 is processed, image data within deliverable area shape 906-3 is processed, and image data within deliverable area shape 906-4 is processed, without processing any image data corresponding to the footprint of the structures 904-1/904-2 or the portion 910 of the parcel that is not encompassed by a deliverable area shape 906.

Processing of the image data within each deliverable area shape may be performed using a variety of imaging processing techniques. For example, one or more convolutional neural networks ("CNN"), or other deep learning model, may be trained to process image data to determine if the deliverable area shape is clear and free of any objects, such as trees, bushes, tables, chairs, swimming pools, umbrellas, etc. Other processing techniques such as edge detection, object detection, etc., may likewise be used to determine if all or a portion of a deliverable area shape is clean and available for aerial item delivery.

In some implementations, a color histogram of the pixel values of pixels of the image data corresponding to a deliverable area shape may be determined and a probability generated based on that color histogram as to whether the area within the deliverable area shape is clear and available for aerial item delivery. For example, if the color histogram reveals a continuous color within the deliverable area shape that corresponds to a known color of grass or concrete, the deliverable area shape may be assigned a high deliverability score. In comparison, if the color histogram reveals numerous colors that correspond to colors typical of plants, bushes, flowers, etc., the deliverable area shape is assigned a low deliverability score.

Image statistics, such as color histograms, edge densities and directions, co-occurrence matrices, autocorrelation functions, etc., may likewise be used to determine a deliverability score for the image. Image statistics, like the color histogram, may be used to determine an overall availability of a deliverable area shape based on information about the image, such as pixel values, pixel variation, shadows, brightness, hue, etc.

In some implementations, a deliverability score for some or all of the deliverable area shapes may be computed. The deliverability score may be based on, for example, one or more of objects represented in the image data, image statistics, the color histogram of the image data corresponding to the deliverable area shape, a size of the deliverable area shape, a shape of the deliverable area shape, a topology of the portion of the parcel encompassed by the deliverable area shape, etc.

Returning to FIG. 9, processing of deliverable area shape 906-1 indicates that a portion of the deliverable area shape is covered with trees and thus, those portions are not available for aerial item delivery. In some implementations, the deliverable area shape 906-1 may be excluded from further consideration and the image data discarded. In other implementations, if a deliverable area shape is reduced in size, it may again be confirmed whether the reduced size still exceeds the delivery area threshold. If the reduced size does not exceed the delivery area threshold, the deliverable area shape may be removed from consideration. In still other implementations, as illustrated, a size and shape of the deliverable area shape may be reduced to encompass a smaller portion that is determined to be available for aerial item delivery and still above the delivery area threshold. In this example, the smaller portion 912 corresponds to a section of grass and a sidewalk.

Likewise, image data corresponding to deliverable area shapes 906-2, 906-3, and 906-4 may be processed. In the illustrated example, deliverable area shape 906-3 may be excluded from further consideration because the image data processing indicates that the portion of the parcel within the deliverable area shape 906-3 includes plants, trees, etc., as illustrated. In comparison, processing of the image data encompassed by deliverable area shape 906-2 indicates that a portion of that area is open and available for aerial item delivery. Likewise, image processing of the image data corresponding to deliverable area shape 906-4 indicates that the entire area is available for aerial item delivery.

In the illustrated example, deliverable area shape 906-4 may be assigned the highest rank or delivery score because the entire portion of the parcel that is encompassed within the deliverable area shape 906-4 is determined to be available for aerial item delivery. In comparison, deliverable area shape 906-3 may be assigned the lowest delivery score, or removed from consideration, because image processing determines that there is no portion within deliverable area shape 906-3 that is available for aerial item delivery. In some implementations, delivery scores for a deliverable area shape may be increased or decreased based on overlapping deliverable area shapes. For example, the delivery score for deliverable area shape 906-4 may be increased because of the overlap with a portion of deliverable area shape 906-2 that is determined to also be available for aerial item delivery. In comparison, the delivery score for deliverable area shape 906-1 and/or reduced area 912, may be reduced because of the determination that the portion of overlapping deliverable area shapes 906-2 and 906-3 are not available for aerial item delivery.

By ranking deliverable area shapes determined for a parcel, a delivery point within a highest ranked deliverable area shape may be assigned to an aerial vehicle as part of a delivery route and/or an aerial vehicle may be instructed to process the highest ranked deliverable area shape first to determine a delivery point. Likewise, one or more secondary delivery points within other deliverable area shapes associated with the parcel may also be selected and assigned as part of the delivery route in the event the primary delivery point is determined to be unavailable during an actual aerial item delivery to the parcel.

Figure 10:
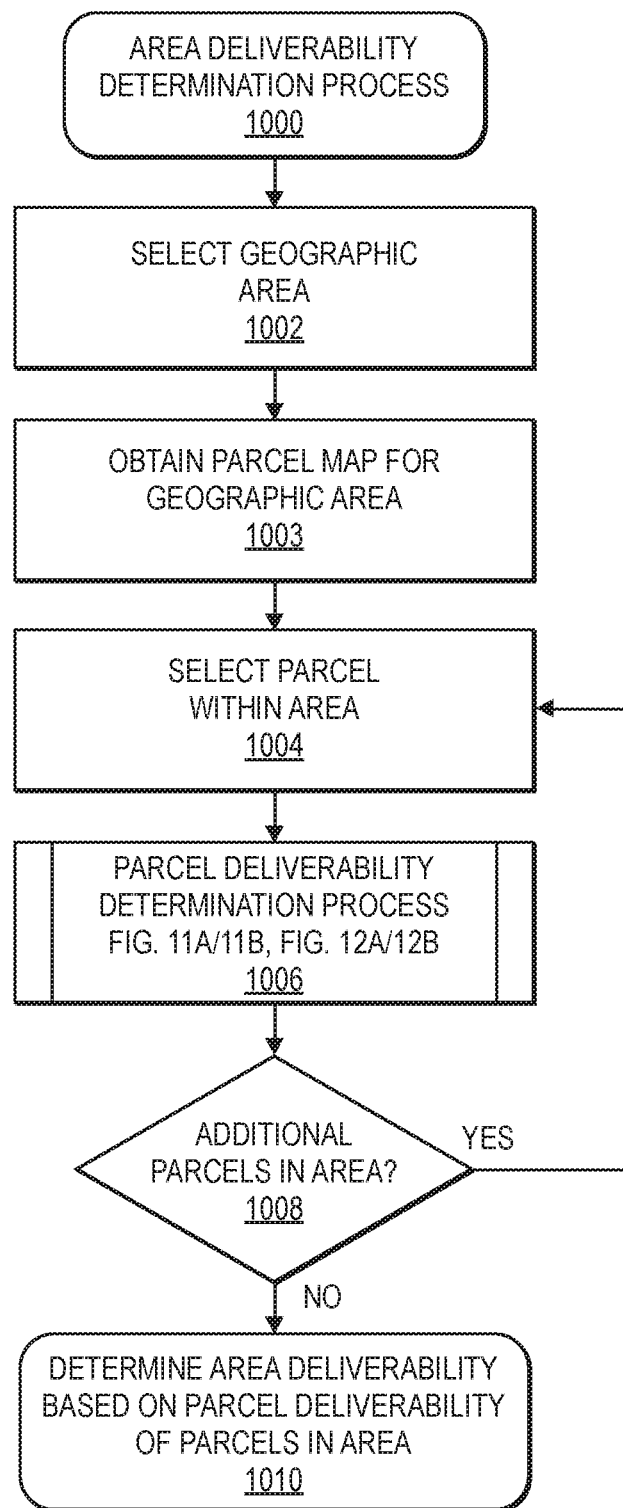
FIG. 10 is an example area deliverability determination process, in accordance with described implementations.

FIG. 10 is an example area deliverability determination process 1000, in accordance with described implementations.

The example process may be used for any size geographic area to determine the deliverability of parcels in that geographic area, without having to process any image data of the area. The example process 1000 begins by selecting a geographic area, as in 1002. The geographic area may be, for example, a neighborhood, a group of several neighborhoods, a city, a group of cities, a town, a group of towns, a geographical defined area (e.g., a fifty mile radius), a state, etc.

A parcel map for the selected geographic area is then obtained, as in 1003. A parcel may be obtained from any source, such as a public source, that maintains parcel maps. For example, government bodies typically maintain parcel maps for different areas that are updated based on permits issued by that or other government entities. As discussed above, parcel maps include parcel boundary information and outlines or footprints of structures (e.g., homes, buildings, sheds, swimming pools, etc.) on those parcels. The parcel and each structure is some form of a polygon and quantifiable by latitude and longitude coordinates (or any other projection/coordinate frame).

The example process 1000 then selects a parcel from the plurality of parcels included in parcel map, as in 1004. A parcel may be selected at random, in a sequential order, etc. For the selected parcel, the parcel deliverability determination process is performed, as in 1006. Example parcel deliverability determination processes are discussed further below with respect to FIGS. 11A, 11B, 12A, and 12B. The result of the parcel deliverability determination process is an indication as to whether the parcel is available for aerial item delivery and optionally a parcel deliverability score for the parcel. The parcel deliverability score indicates an overall confidence that the parcel is available for aerial item delivery. The parcel deliverability score may be determined based on, for example, deliverable area shape, scores for deliverable area shapes associated with the parcel, the size, shape, and/or number of deliverable area shapes that are indicated as available for aerial item delivery and associated with the parcel, etc.

A determination is then made as to whether additional parcels in the selected geographic area remain that are to be processed by the example process 1000, as in 1008. If additional parcels remain, the example process 1000 returns to block 1004 and continues by selecting a next parcel. If no additional parcels remain, the example process 1000 determines an area deliverability or area score based on the determined parcel deliverability of parcels in the area, as in

1010. The area deliverability may be any form of indicator as to the availability of parcels within the geographic area to receive aerial item delivery. For example, the area deliverability may be a percentage of parcels that are available for aerial item delivery out of all the parcels within the geographic area. As another example, the area deliverability may be a ratio between the parcels determined to be available for aerial item delivery and parcels not available for aerial item delivery, or total parcels. In still other examples, the area deliverability may be a raw number of parcels determined to be available for aerial item delivery. In still other examples, the area deliverability may be a weighted sum of the parcel deliverability scores of parcels within the area.

Figure 11A:
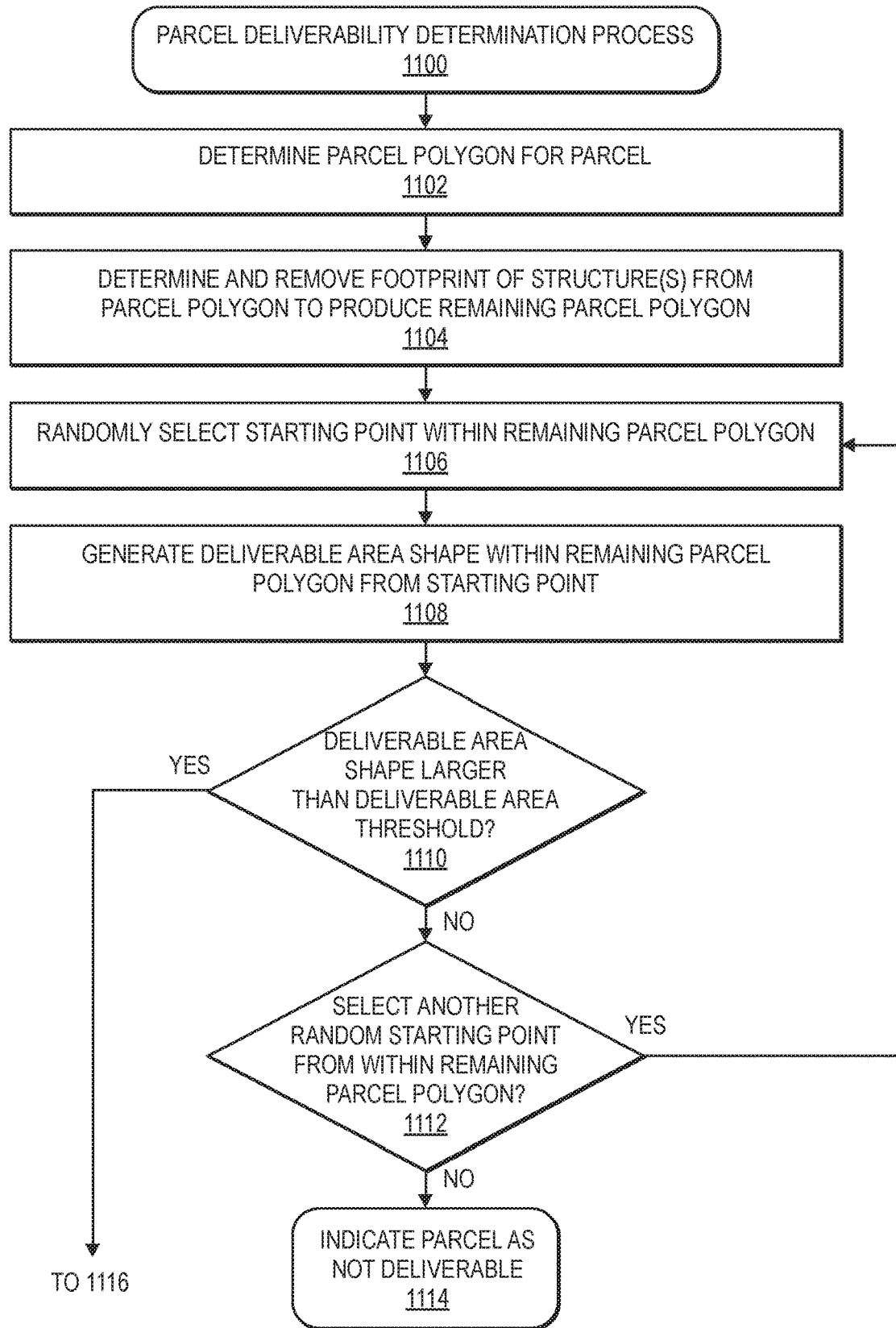
FIGS. 11A and 11B are an example parcel deliverability determination process, in accordance with described implementations.
Figure 11B:
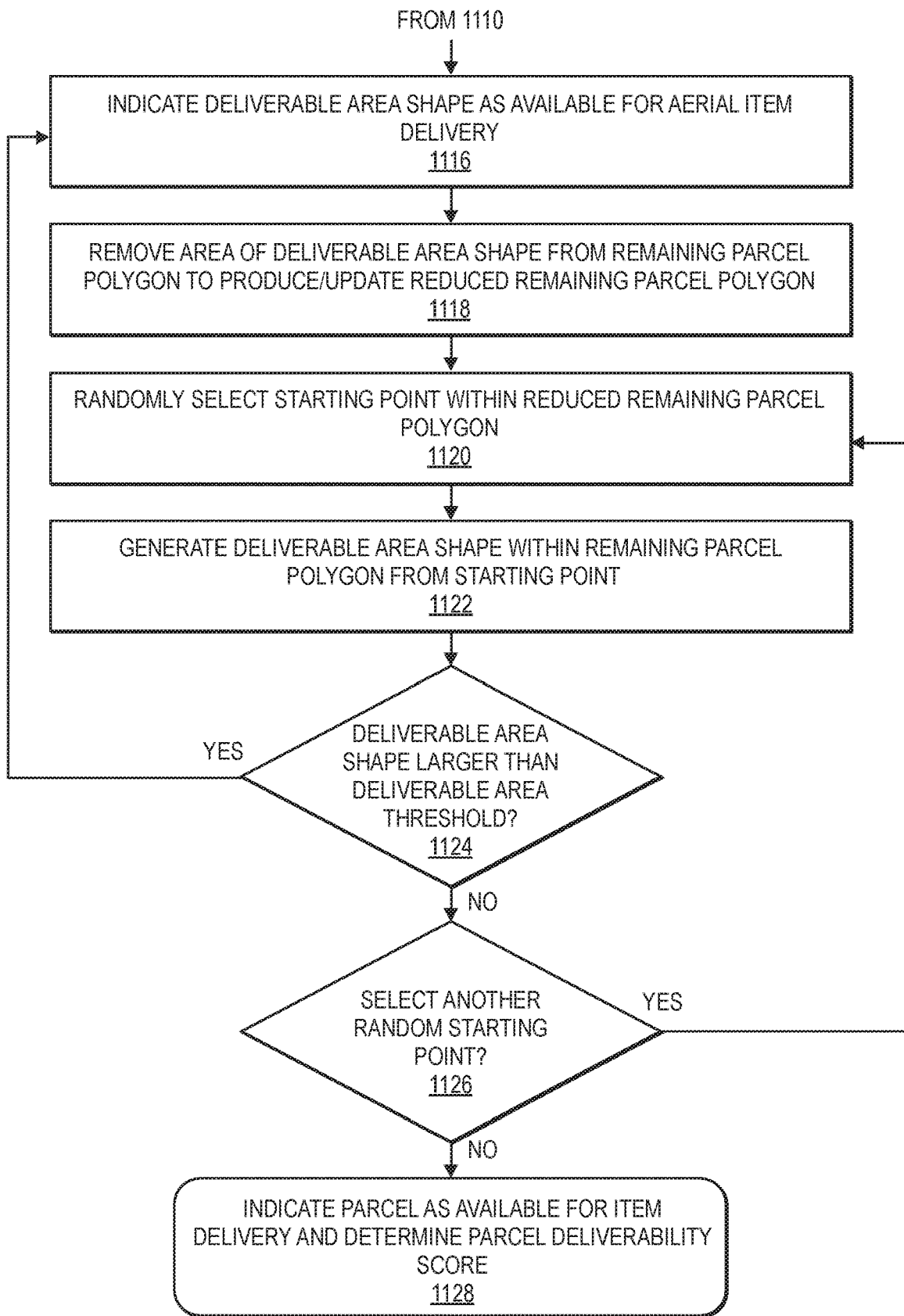

FIGS. 11A and 11B are an example parcel deliverability determination process 1100, in accordance with described implementations.

The example process 1100 begins in FIG. 11A by determining a parcel polygon for a parcel, as in 1102. As noted above, parcel maps typically include latitude and longitude (or other projection/coordinate frame) for parcel boundaries. Utilizing the parcel map, a parcel polygon representative of the shape and size of the parcel may be generated. FIG. 2 is an illustration of an example parcel polygon.

In addition to generating a parcel polygon for the parcel, the outline or footprint of structures on the parcel are determined and the area of the parcel corresponding to those footprints removed from the parcel polygon to produce a remaining parcel polygon, as in 1104. Again, the footprint or outline of structures at the parcel may be obtained from the parcel map. FIG. 3 is an example remaining parcel polygon in which the portion of the area of the parcel polygon corresponding to the footprint of the structure is removed.

In this example, a starting point within the remaining parcel polygon is randomly selected, as in 1106. While the disclosed implementation discusses random selection, in other implementations the starting point may be at a defined position, e.g., top left quadrant of the remaining parcel polygon. Alternatively, the example process 1100 may determine a largest area of the parcel polygon that is not encumbered or encroached by the footprint of the structure and select a starting point within that area. Other techniques may likewise be utilized to select a starting point.

From the selected starting point, a deliverable area shape is formed within the remaining parcel polygon that is as large as possible without expanding beyond the parcel polygon or encroaching on the portion of the area corresponding to the footprint of the structure that was removed, as in 1108. As discussed above, any shape may be used as the deliverable area shape including, but not limited to, rectangles, squares, circles, ellipses, etc. In some examples, the deliverable area shape is formed in compliance with constraints that specify that the deliverable area shape must contact at least one edge or perimeter of the parcel polygon and at least one edge or perimeter of the portion of the area corresponding to the footprint of the structure that was removed but must not expand beyond the perimeter of the parcel polygon or encroach on the portion of area corresponding to the footprint of the structure(s) that was removed from the remaining parcel polygon.

Upon forming the deliverable area shape, a determination is made as to whether the deliverable area shape, or an area of the parcel polygon encompassed by the deliverable area shape, is larger than a deliverable area threshold, as in 1110. The deliverable area threshold may be any size or area indicator and may be different for different geographic areas, different parcels, etc. In some implementations, the deliverable area threshold may be a polygon that is at least two meters by two meters. In other implementations, the deliverability are threshold may be different.

If it is determined that the deliverable area shape is not larger than the deliverable area threshold, a determination is made as to whether another starting point is to be selected, as in 1112. In some implementations, the example process 1100 may attempt to produce deliverable area shapes from multiple starting points if the initial deliverable area shape does not exceed the deliverable area threshold. If it is determined that another starting point is to be selected, the example process returns to block 1106 and continues. However, if it is determined that another starting point is not to be selected, the example process 1100 completes and the parcel is indicated as not available for aerial item delivery, as in 1114.

Returning to decision block 1110 if it is determined that the deliverable area shape is larger than the deliverable area threshold, the example process 1100 continues to FIG. 11B and the deliverable area shape is indicated as available for aerial item delivery, as in 1116. For example, the area or coordinates of the remaining parcel polygon corresponding to the deliverable area shape may be indicated in a datastore as available for aerial item delivery.

In addition to indicating the deliverable area shape as available for aerial item delivery, if one has not yet been produced for the parcel polygon, a reduced remaining parcel polygon is generated from the remaining parcel polygon by removing the area of the remaining parcel polygon that corresponds to the deliverable area shape, as in 1118. The reduced remaining parcel polygon is the parcel polygon with the portion of the area of the parcel polygon corresponding to the footprint of the structures at the parcel removed and any portions of the area already encompassed by a deliverable area shape determined by the example process 1100 to be available for aerial item delivery removed. The reduced remaining parcel polygon may be updated each time an additional deliverable area shape is determined to be available for aerial item delivery. In comparison, the remaining parcel polygon, as noted above, is the parcel polygon with the portion of the area of the parcel polygon corresponding to the footprint of structures at the parcel removed.

Another starting point is then selected, for example randomly selected, from within the area included in the reduced remaining parcel polygon, as in 1120. By limiting the selection of a starting point to the area included in the reduced remaining parcel polygon ensures that different starting points are selected and that all portions of the parcel are eventually processed and considered for determining availability of the parcel for aerial item delivery.

Upon selecting the next starting point, a deliverable area shape is generated from the starting point that remains within the area of the remaining parcel polygon, as in 1122. It is worth noting here, that in the example process 1100, while the starting point is selected from the area included in the reduced remaining parcel polygon, the deliverable area shape formed from that starting point is with respect to the area included in the remaining parcel polygon. As a result, while the formed deliverable area shape may conform to the constraints of not expanding beyond the parcel polygon or encroaching on the portion of the area corresponding to the footprint of the structure, the deliverable area shape may overlap a portion of the area already encompassed by another deliverable area shape already formed for the parcel—i.e., deliverable area shapes for a parcel may overlap.

After forming the deliverable area shape, a determination is made as to whether the deliverable area shape, or a portion of the area of the parcel polygon encompassed by the deliverable area shape, is larger than the deliverable area threshold, as in 1124. If it is determined that the deliverable area shape is larger than the deliverable area threshold, the example process 1100 returns to block 1116 and continues.

However, if it is determined that the deliverable area shape is not larger than the deliverable area threshold, a determination is made as to whether another starting point is to be selected, as in 1126. In some implementations, the example process may attempt to produce deliverable area shapes from multiple starting points if the formed deliverable area shape does not exceed the deliverable area threshold. If it is determined that another starting point is to be selected, the example process 1100 returns to block 1120 and continues. If it is determined that another starting point is not to be selected, the example process 1100 completes and the parcel is indicated as available for aerial item deliverability and optionally a parcel deliverability score may be determined, as in 1128. The parcel is indicated as available for aerial item delivery because at least one deliverable area shape was determined to be larger than the deliverable area threshold and indicated as available aerial item delivery.

The parcel deliverability score is an indication as to the confidence that the parcel is available for aerial item delivery. For example, the parcel deliverability score may be any indication as to a percentage or amount of the parcel polygon that is encompassed by one or more deliverable area shapes and determined to be available for aerial item delivery. For example, if 50% of the area of the parcel polygon corresponds to the footprint of the structure, 20% of the area parcel polygon is determined to not be of a size large enough to be considered available for aerial item delivery (e.g., the deliverable area shape did not exceed the deliverable area threshold), and 30% of the area of the parcel polygon is determined to be available for aerial item delivery, the deliverability score may be 30%. In other implementations, the deliverability score may factor in or consider one or more of the size of the area of the parcel polygon that is determined to be available for aerial item delivery, the size of the largest deliverable area shape determined to be available for aerial item delivery, the number of deliverable area shapes determined to be available aerial item delivery, etc.

Figure 12A:
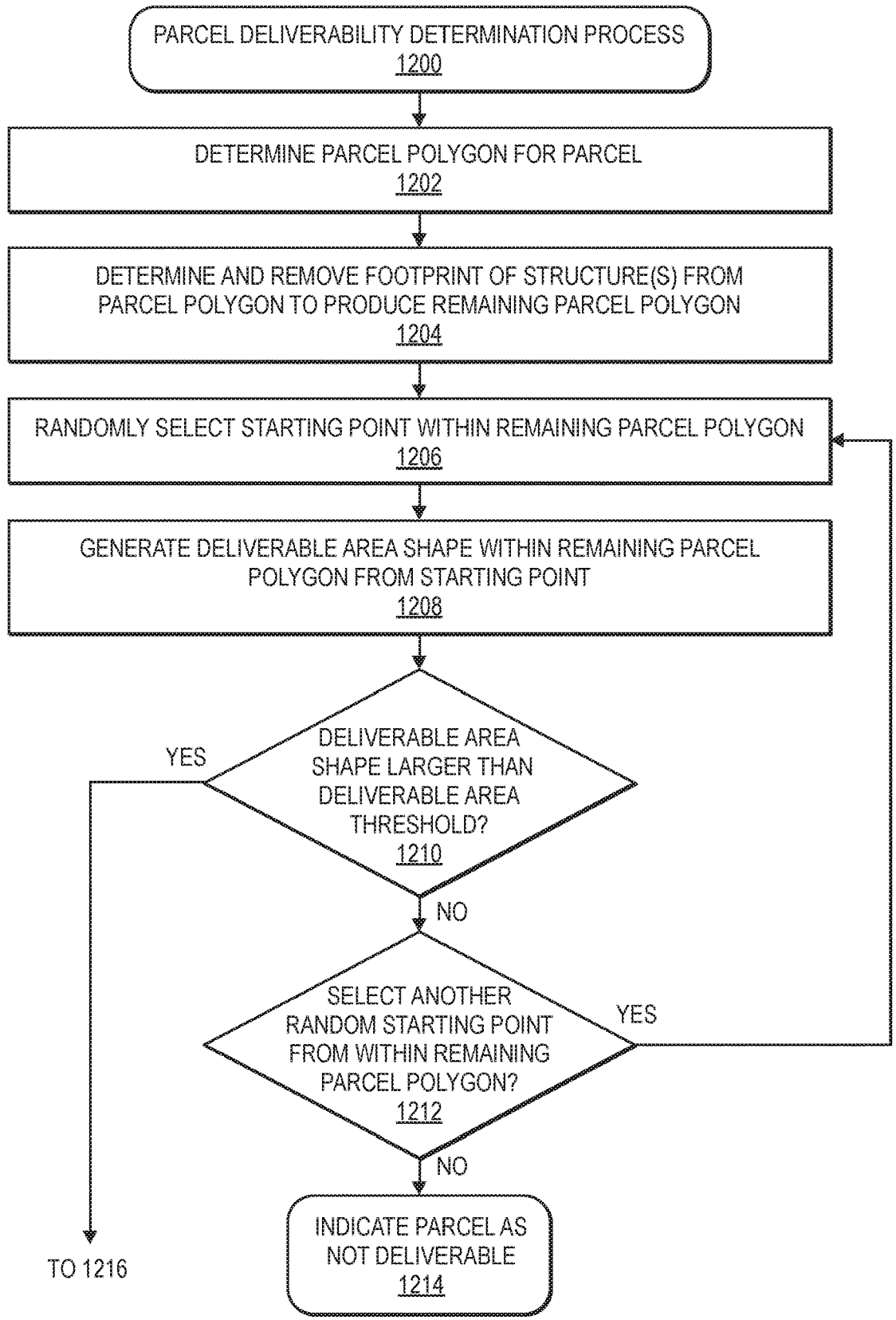
FIGS. 12A and 12B are an example parcel deliverability determination process, in accordance with described implementations.
Figure 12B:
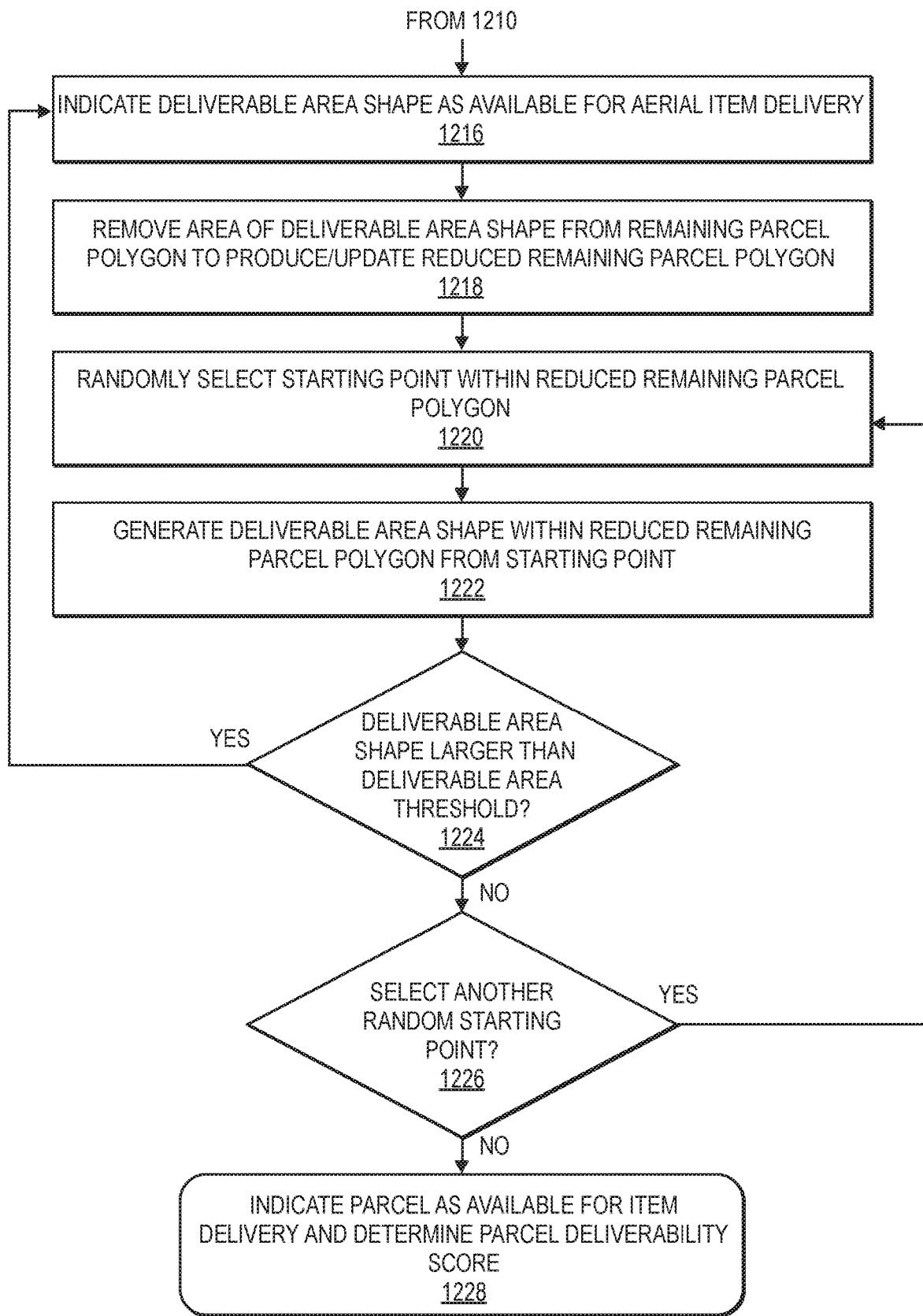

FIGS. 12A and 12B are an example parcel deliverability determination process, in accordance with described implementations.

The example process 1200 begins in FIG. 12A by determining a parcel polygon for a parcel, as in 1202. As noted above, parcel maps typically include latitude and longitude (or other projection/coordinate frame, such as UTM, MGRS, or WGS84) for parcel boundaries. Utilizing the parcel map, a parcel polygon representative of the shape and size of the parcel may be generated. FIG. 2 is an illustration of an example parcel polygon.

In addition to generating a parcel polygon for the parcel, the outline or footprint of structures on the parcel are determined and the area of the parcel corresponding to those footprints removed from the parcel polygon to produce a remaining parcel polygon, as in 1204. Again, the footprint or outline of structures at the parcel may be obtained from the parcel map. FIG. 3 is an example remaining parcel polygon in which the portion of the area of the parcel polygon corresponding to the footprint of the structure is removed.

In this example, a starting point within the remaining parcel polygon is randomly selected, as in 1206. While the disclosed implementation discusses random selection, in other implementations the starting point may be at a defined position, e.g., top left quadrant of the remaining parcel polygon, selected based on a tessellation scheme, e.g., centroids of cells from Voronoi tessellation of the parcel polygon, etc. Alternatively, the example process 1200 may determine a largest area of the parcel polygon that is not encumbered or encroached by the footprint of the structure and select a starting point within that area. Other techniques may likewise be utilized to select a starting point.

From the selected starting point, a deliverable area shape is formed within the remaining parcel polygon that is as large as possible without expanding beyond the parcel polygon or encroaching on the portion of the area corresponding to the footprint of the structure that was removed, as in 1208. As discussed above, any shape may be used as the deliverable area shape including, but not limited to, rectangles, squares, circles, ellipses, etc. In some examples, the deliverable area shape is formed in compliance with constraints that specify that the deliverable area shape must contact at least one edge or perimeter of the parcel polygon and at least one edge or perimeter of the portion of the area corresponding to the footprint of the structure that was removed but must not expand beyond the perimeter of the parcel polygon or encroach on the portion of area corresponding to the footprint of the structure(s) that was removed from the remaining parcel polygon.

Upon forming the deliverable area shape, a determination is made as to whether the deliverable area shape, or an area of the parcel polygon encompassed by the deliverable area shape, is larger than a deliverable area threshold, as in 1210. The deliverable area threshold may be any size or area indicator and may be different for different geographic areas, different parcels, etc. In some implementations, the deliverable area threshold may be a polygon that is at least two meters by two meters. In other implementations, the deliverable area threshold may be different.

If it is determined that the deliverable area shape is not larger than the deliverable area threshold, a determination is made as to whether another starting point is to be selected, as in 1212. In some implementations, the example process 1200 may attempt to produce deliverable area shapes from multiple starting points if the initial deliverable area shape does not exceed the deliverable area threshold. If it is determined that another starting point is to be selected, the example process returns to block 1206 and continues. However, if it is determined that another starting point is not to be selected, the example process 1200 completes and the parcel is indicated as not available for aerial item delivery, as in 1214.

Returning to decision block 1210 if it is determined that the deliverable area shape is larger than the deliverable area threshold, the example process 1200 continues to FIG. 12B and the deliverable area shape is indicated as available for aerial item delivery, as in 1216. For example, the area or coordinates of the remaining parcel polygon corresponding to the deliverable area shape may be indicated in a datastore as available for aerial item delivery.

In addition to indicating the deliverable area shape as available for aerial item delivery, if one has not yet been produced for the parcel polygon, a reduced remaining parcel polygon is generated from the remaining parcel polygon by removing the area of the remaining parcel polygon that corresponds to the deliverable area shape, as in 1218. The reduced remaining parcel polygon is the parcel polygon with the portion of the area of the parcel polygon corresponding to the footprint of the structures at the parcel removed and any portions of the area already encompassed by a deliverable area shape determined by the example process 1200 to be available for aerial item delivery removed. The reduced remaining parcel polygon may be updated each time an additional deliverable area shape is determined to be available for aerial item delivery. In comparison, the remaining parcel polygon, as noted above, is the parcel polygon with the portion of the area of the parcel polygon corresponding to the footprint of structures at the parcel removed.

Another starting point is then selected, for example randomly selected, from within the area included in the reduced remaining parcel polygon, as in 1220. By limiting the selection of a starting point to the area included in the reduced remaining parcel polygon ensures that different starting points are selected and that all portions of the parcel are eventually processed and considered for determining availability of the parcel for aerial item delivery.

Upon selecting the next starting point, a deliverable area shape is generated from the starting point that remains within the area of the reduced remaining parcel polygon, as in 1222. In comparison to the example process 1100 discussed with respect to FIGS. 11A through 11B, the example process 1200 limits the deliverable area shape to the area included in the reduced remaining parcel polygon. As a result, the formed deliverable area shape will conform to the constraints of not expanding beyond the parcel polygon or encroaching on the portion of the area corresponding to the footprint of the structure and will not overlap any other already formed deliverable area shape or encompass any portion of the area of the parcel already encompassed by another deliverable area shape—i.e., deliverable area shapes for a parcel do not overlap.

After forming the deliverable area shape, a determination is made as to whether the deliverable area shape, or a portion of the area of the parcel polygon encompassed by the deliverable area shape, is larger than the deliverable area threshold, as in 1224. If it is determined that the deliverable area shape is larger than the deliverable area threshold, the example process 1200 returns to block 1216 and continues.

However, if it is determined that the deliverable area shape is not larger than the deliverable area threshold, a determination is made as to whether another starting point is to be selected, as in 1226. In some implementations, the example process may attempt to produce deliverable area shapes from multiple starting points if the formed deliverable area shape does not exceed the deliverable area threshold. If it is determined that another starting point is to be selected, the example process 1200 returns to block 1220 and continues. If it is determined that another starting point is not to be selected, the example process 1200 completes and the parcel is indicated as available for aerial item deliverability and optionally a parcel deliverability score may be determined, as in 1228. The parcel is indicated as available for aerial item delivery because at least one deliverable area shape was determined to be larger than the deliverable area threshold and indicated as available aerial item delivery.

The parcel deliverability score may be any indication as to a percentage or amount of the parcel polygon that is encompassed by one or more deliverable area shapes and determined to be available for aerial item delivery. For example, if 50% of the area of the parcel polygon corresponds to the footprint of the structure, 20% of the area parcel polygon is determined to not be of a size large enough to be considered available for aerial item delivery (e.g., the deliverable area shape did not exceed the deliverable area threshold), and 30% of the area of the parcel polygon is determined to be available for aerial item delivery, the deliverability score may be 30%. In other implementations, the deliverability score may factor in or consider one or more of the size of the area of the parcel polygon that is determined to be available for aerial item delivery, the size of the largest deliverable area shape determined to be available for aerial item delivery, the number of deliverable area shapes determined to be available aerial item delivery, etc.

Figure 13:
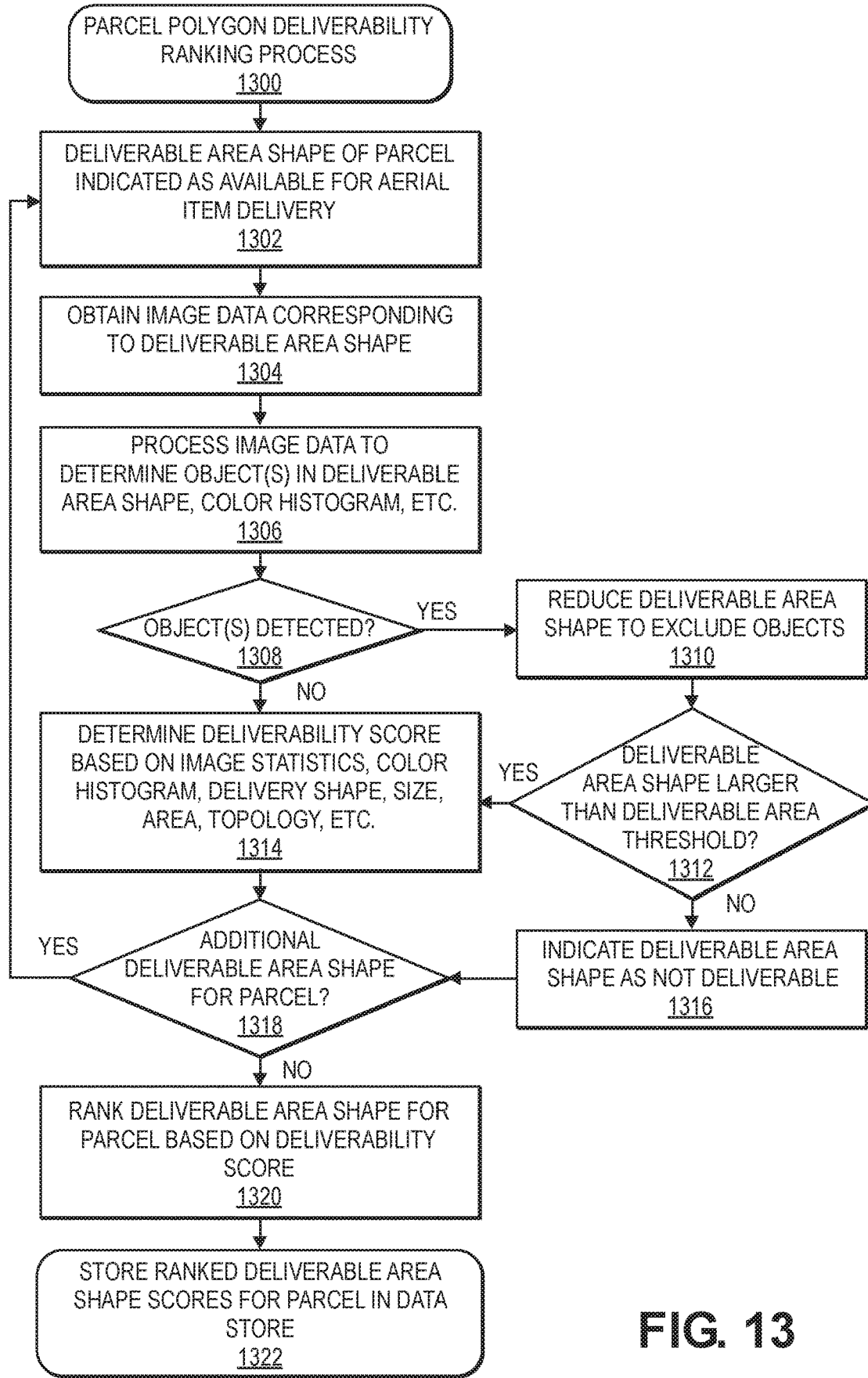
FIG. 13 is an example parcel polygon deliverability ranking process, in accordance with described implementations.

FIG. 13 is an example parcel polygon deliverability ranking process 1300, in accordance with described implementations.

The example process 1300 beings by selecting a deliverable area shape of a parcel that has been indicated as available for aerial item delivery, as in 1302. Image data corresponding to the area of the parcel encompassed by the deliverable area shape is also obtained, as in 1304. Image data for a parcel may be obtained from image data generated by one or more UAS, satellite imagery data, image data generated from other aerial vehicles, etc. In some implementations, image data that includes the entire parcel may be obtained and the portion of the parcel encompassed by the deliverable area shape extracted as part of the example process 1300.

The image data corresponding to the area of the parcel that is encompassed by the deliverable area shape is then processed to determine any objects present in the image data, a color histogram of the image data, etc., as in 1306. Processing of the image data may be performed using a variety of image processing techniques. For example, one or more CNNs, or other deep learning model, may be trained to process image data to determine if the deliverable area shape is clear and free of any objects, such as trees, bushes, tables, chairs, swimming pools, umbrellas, etc. Other processing techniques such as edge detection, object detection, etc., may likewise be used to determine if all or a portion of a deliverable area shape is clean and available for aerial item delivery. Likewise, a color histogram of the pixel values of pixels of the image data corresponding to a deliverable area shape may be determined.

A determination is then made as to whether any objects (e.g., trees, buildings, bushes, swimming pools, etc.) were detected in the image data corresponding to the deliverable area shape, as in 1308. If it is determined that one or more objects are detected, the deliverable area shape may be reduced in size to exclude from the deliverable area shape the portion that is determined to include one or more objects, as in 1310. If the deliverable area shape is reduced in size, a determination may again be made as to whether the reduced size deliverable area shape still exceeds the deliverable area threshold, as in 1312. If it is determined that the reduced size deliverable area shape does not exceed the deliverable area threshold, the deliverable area shape is indicated as not available for aerial item delivery (e.g., not deliverable), as in 1316. In some implementations, if a portion of the deliverable area shape is determined to include objects, rather than reducing the deliverable area shape, the deliverable area shape may be indicated as not deliverable.

If it is determined in decision block 1312 that the reduced size deliverable area shape is larger than the deliverable area threshold, or if it determined in decision block 1308 that no objects were detected in the deliverable area shape, a deliverability score for the deliverable area shape is determined, as in 1314. The deliverability score indicates a likelihood or probability to successfully determining a delivery point within the deliverable area shape and completing an actual aerial item delivery of an item to that delivery point in the deliverable area shape.

The deliverability score may be based on, for example, one or more of image statistics, the color histogram of the deliverable area shape, the shape of the deliverable area shape, the size of the deliverable area shape, a topology of the surface of the portion of the parcel encompassed by the deliverable area shape, etc. For example, the color histogram may be processed to determine a probability of the deliverable area shape being deliverable. In some implementations, different color histograms may be indicated as indicative of open and clear areas, such as lawns, driveways, patios, porches, etc., to which aerial item delivery may be successfully completed. The probability of the color histogram may be combined with dimension or size information of the deliverable area shape to determine an overall deliverability score.

Upon generating a deliverability score for the deliverable area shape in block 1314, or if it is determined in block 1316 that the deliverable area shape is not available for aerial item delivery, a determination is made as to whether additional deliverable area shapes that are indicated as available for aerial item delivery exist for the parcel, as in 1318. If additional deliverable area shapes remain, the example process 1300 returns to block 1302 and continues. If it is determined that there are no additional deliverable area shapes for the parcel, the deliverable area shapes are ranked based on the determined deliverability scores, as in 1320, and the ranked deliverable area shapes with the ranked deliverability scores are stored in a data store, as in 1322. Ranked deliverable area shapes may be used, for example, in route and item delivery planning and/or during item delivery to prioritize different portions of a parcel for aerial item delivery of an item to that parcel. For example, as discussed further below with respect to FIG. 14, an aerial vehicle may first determine or receive a delivery point that is within a highest ranked deliverable area shape of the parcel as a first priority for the aerial item delivery. If, during an attempted aerial item delivery, the aerial vehicle is not able to aerially deliver the item to the delivery point in the first deliverable area shape, the aerial vehicle may query the ranked list to select a next highest ranked deliverable area shape for aerial item delivery. This may continue until the item is successfully delivered or it is determined that there are no portions of the parcel to which aerial item delivery can be accomplished.

Figure 14:
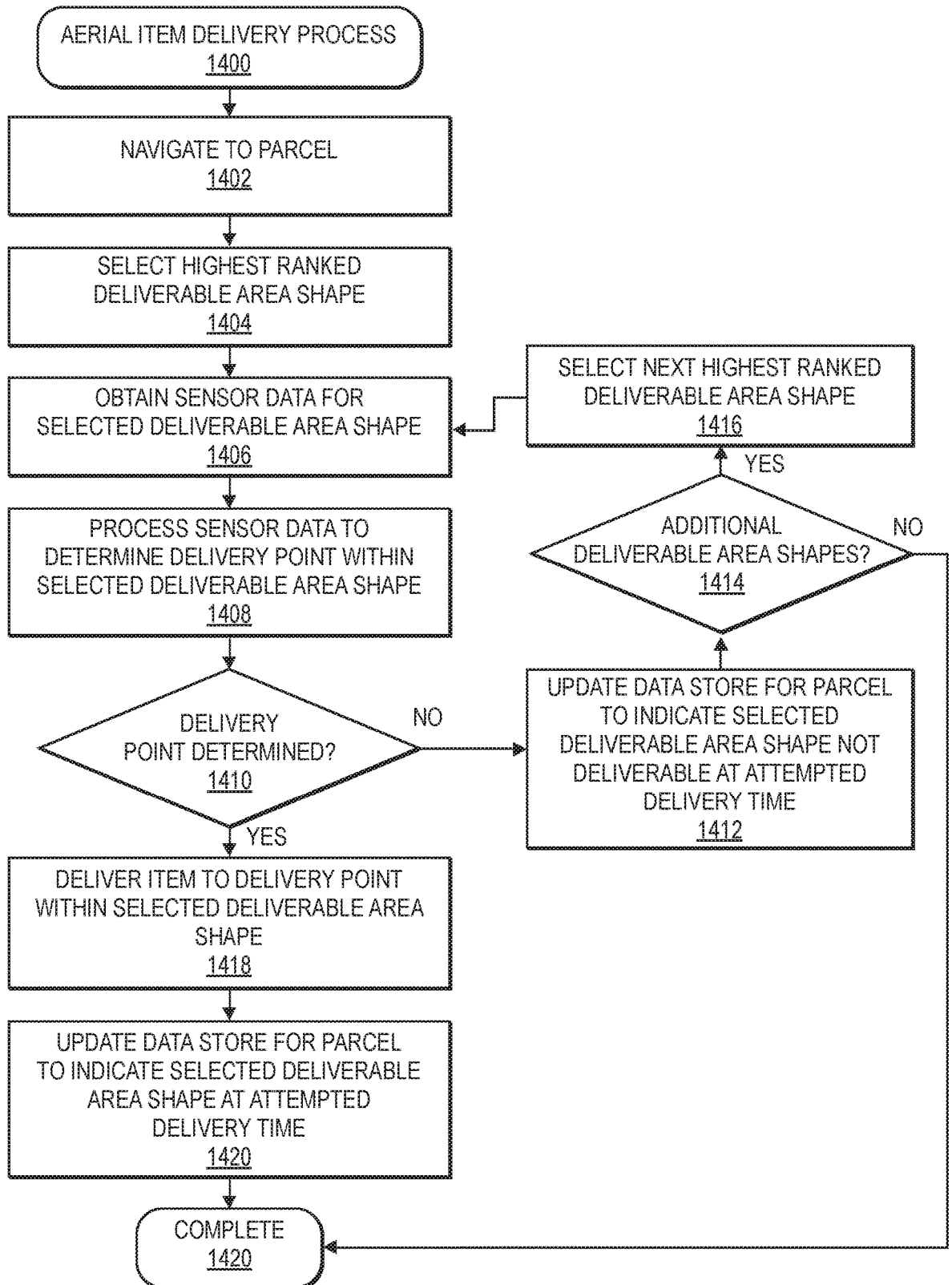
FIG. 14 is an example aerial item delivery process, in accordance with described implementations.

FIG. 14 is an example aerial item delivery process 1400, in accordance with described implementations.

The example process 1400 begins by causing or instructing an aerial vehicle to aerially navigate a route to a parcel to which an item is to be aerially delivered by the aerial vehicle, as in 1402. A highest ranked deliverable area shape corresponding to the parcel is also selected, as in 1404. The deliverable area shape may be selected by one or more computing resources that are independent of the aerial vehicle or may be selected by the aerial vehicle as part of the aerial navigation and item delivery.

When the aerial vehicle arrives at the parcel, it may be instructed to obtain sensor data, such as image data, of at least the portion of the parcel corresponding to the deliverable area shape, as in 1406. The sensor data is obtained while the aerial vehicle is airborne and positioned above the parcel. The sensor data of the deliverable area shape is then processed to determine a delivery point within the deliverable area shape that is clear and available for descent by the aerial vehicle and aerial delivery of the item, as in 1408.

In some implementations, the image data may include more than just the portion of the parcel encompassed by the deliverable area shape. In such an example, the portion of the image data corresponding to the deliverable area shape may be extracted from the image data and only that portion processed. As discussed above, only processing the portion of the image data corresponding to the selected deliverable area shape increases the speed at which a delivery point is determined and reduces computing requirements.

A delivery point may be determined based on an image processing of the image data corresponding to the deliverable area shape to determine a largest clear and open area within the deliverable area shape that is free of obstacles. Image processing of a portion of the parcel already determined as available for aerial item delivery at the actual time of aerial item delivery is done to ensure that the portion of the parcel is unchanged and remains free of obstacles before actual aerial item delivery is attempted. This increases the safety and reliability of aerial item delivery.

A determination is then made as to whether a delivery point was determined, as in 1410. If a delivery point was not determined, the data store is updated to indicate that the selected delivery area is not available for aerial item delivery at the time of the attempted actual aerial item delivery, as in 1412. In some implementations, the example process 1400 may also determine if the inability to determine a delivery point is based on stationary objects (e.g., trees, shrubs, bushes, tables, chairs) within the deliverable area shape or whether the inability to determine a delivery area point is due to a moving object detected around or within deliverable area shape. If the inability is due to a stationary object, the data store may be updated, as indicated above and/or the deliverable area shape score may be decreased due to the determined inability to aerially deliver an item to a delivery point within the deliverable area shape. In comparison, if the inability to determine a delivery point is due to a moving object (e.g. person, animal), the data store may not be updated and/or the score may not be changed because the deliverable area shape may be available for future delivery attempts.

Determining availability of a deliverable area shape at different times may be useful as use and availability of deliverable area shapes of a parcel may change over time. For example, during the summer months, a patio at the parcel may be covered with chairs, tables, and umbrellas (obstacles) and thus not available for aerial item delivery during the summer months. However, during winter months, the obstacles may be put away leaving a clear open space (the patio) that is available for aerial item delivery. By tracking the availability of deliverable area shapes during different times within a datastore, the ranking of those deliverable area shapes for a parcel may change depending on the time of year, etc., based on the likelihood that a deliverable area shape will actually be available for aerial item delivery. In some implementations, the deliverability score for the deliverable area shape may be decreased to reflect the inability to complete an aerial item delivery to a delivery point within the deliverable area shape.

Returning to FIG. 14, after updating the data store at block 1412 that a delivery point was not determined, a determination is made as to whether additional deliverable area shapes indicated as available for aerial item delivery exist at the parcel, as in 1414. If additional deliverable area shapes remain, a next highest ranked deliverable area shape is selected, as in 1416, and the example process 1400 returns to block 1406 and continues. If it is determined that no additional deliverable area shapes indicated as available for aerial item delivery remain, the example process 1400 completes, as in 1420.

In the event no available aerial item delivery point is determined for the parcel, the aerial vehicle may abort the delivery and deliver the item to an alternative location, return to a distribution center, etc. Likewise, a customer that ordered the item or is to receive the item may be notified of the inability to complete the aerial item delivery and that alternative delivery methods will be used to complete delivery of the item to the customer and/or to the parcel.

Returning to decision block 1410, if it is determined that a delivery point is determined, the aerial vehicle completes aerial item delivery of the item to the delivery point within the selected deliverable area shape, as in 1418. In addition, the data store for the parcel may be updated to indicate the delivery point to which the item was aerially delivered and/or to indicate that an item has been actually delivered to the delivery point within the selected deliverable area shape. Likewise, in some implementations, the deliverability score for the deliverable area shape may be increased in response to a confirmed actual aerial delivery of an item to a delivery point within the deliverable area shape. This deliverability score may be adjust for the period of time corresponding to the delivery (e.g., winter months) and/or as a total deliverability score adjustment for the deliverable area shape.

In some implementations, the indication and/or rank of deliverable area shapes may be provided to a user for review, verification, and/or modification. For example, the example process 1400 may provide a ranked list or ranked graphical representation of the parcel to a user indicating which deliverable area shapes within the parcel are highest ranked for aerial item delivery. In such an example, the user may confirm the ranking, rearrange the ranking, or indicate other deliverable area shapes or delivery points at the parcel for aerial item delivery.

Figure 15:
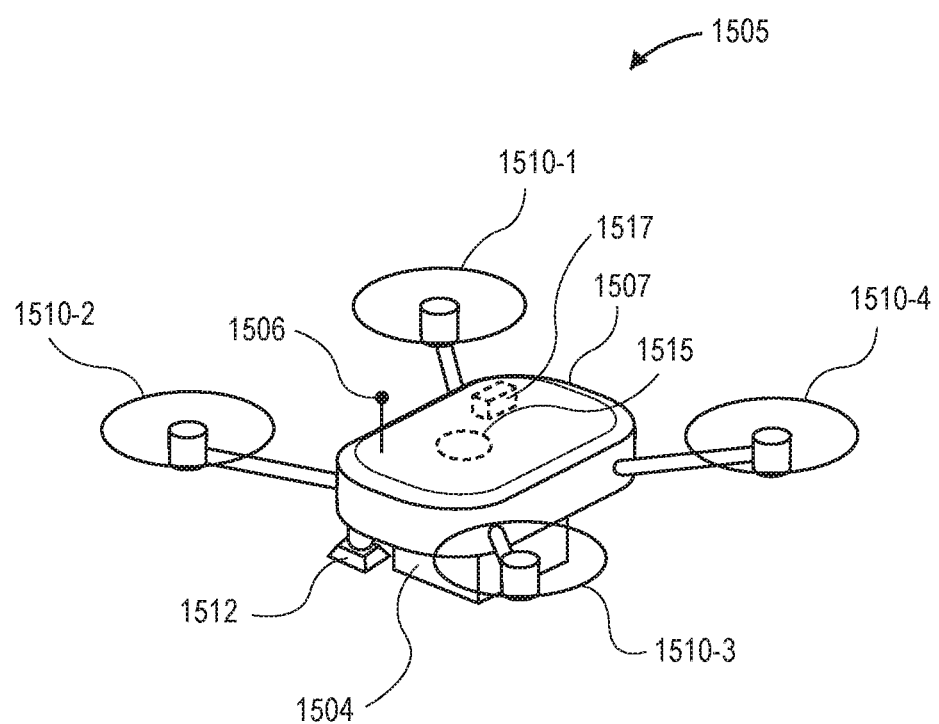
FIG. 15 is an example aerial vehicle, in accordance with described implementations.

FIG. 15 is an example aerial vehicle, in accordance with described implementations.

As illustrated in FIG. 15, an aerial vehicle 1505 may include a frame or body 1507, and a plurality of propulsion mechanisms, such as motors and propellers 1510, coupled to the frame or body 1507. The frame or body 1507 may be formed of any suitable materials, such as carbon fiber, metals, plastics, or combinations thereof. In addition, the motors and propellers 1510 may be coupled to the frame or body 1507, or via one or more motor arms extending from the frame or body 1507. The motors may be any suitable motors for rotating respective propellers 1510 to generate thrust to lift or maneuver at least a portion of the aerial vehicle 1505. The propellers 1510 may be formed of any suitable materials, such as carbon fiber, metals, plastics, or combinations thereof. Further, the aerial vehicle 1505 may also include a control system 1515 that may control operation and navigation of the aerial vehicle 1505, including aspects related to operation of the motors and propellers 1510.

Although FIG. 15 shows an aerial vehicle having a particular shape, size, number of motors and propellers 1510-1, 1510-2, 1510-3, 1510-4, and overall configuration, the systems and methods described herein may be utilized with aerial vehicles having various other shapes, sizes, numbers of motors and propellers, and overall configurations, such as tricopters, quadcopters, hexacopters, octocopters, or various other types of aerial vehicles. In addition, aerial vehicles may include other types of propulsion mechanisms, such as fans, jets, turbojets, turbo fans, jet engines, electric jets, and/or combinations thereof, that may generate noise patterns.

In addition, the aerial vehicle 1505 may include an analysis unit 1517 that includes one or more processors that may process or analyze sensor data to determine one or more delivery points within a deliverable area shape at a parcel for aerial item delivery. The analysis unit 1517 may be included as part of the control system 1515 or independent of the control system 1515.

The aerial vehicle 1505 may also include an antenna 1506 or other wireless transmission mechanism to enable wireless communication between the aerial vehicle and other computing sources, such as computing sources that provide route information, delivery information, indications of deliverable area shapes and/or parcels, etc. Likewise, the aerial vehicle 1505 includes one or more sensors 1512, such as a camera, ranging sensor, altimeter, barometer, etc., that may be used by the control system 1515 and/or the analysis unit 1517 to navigate the aerial vehicle 1505 and/or to obtain sensor data representative of at least a portion of a parcel or deliverable area shape within a parcel. For example, the sensor 1512 may be a digital Red, Green, Blue (RGB) camera oriented to obtain images of a surface, such as parcels, below the aerial vehicle 1505 when the aerial vehicle is airborne.

The aerial vehicle 1505 may also include a payload engagement component 1504 that is operable to engage, carry, and/or disengage a payload, such as an item, for aerial transport by the aerial vehicle 1505.

Figure 16:
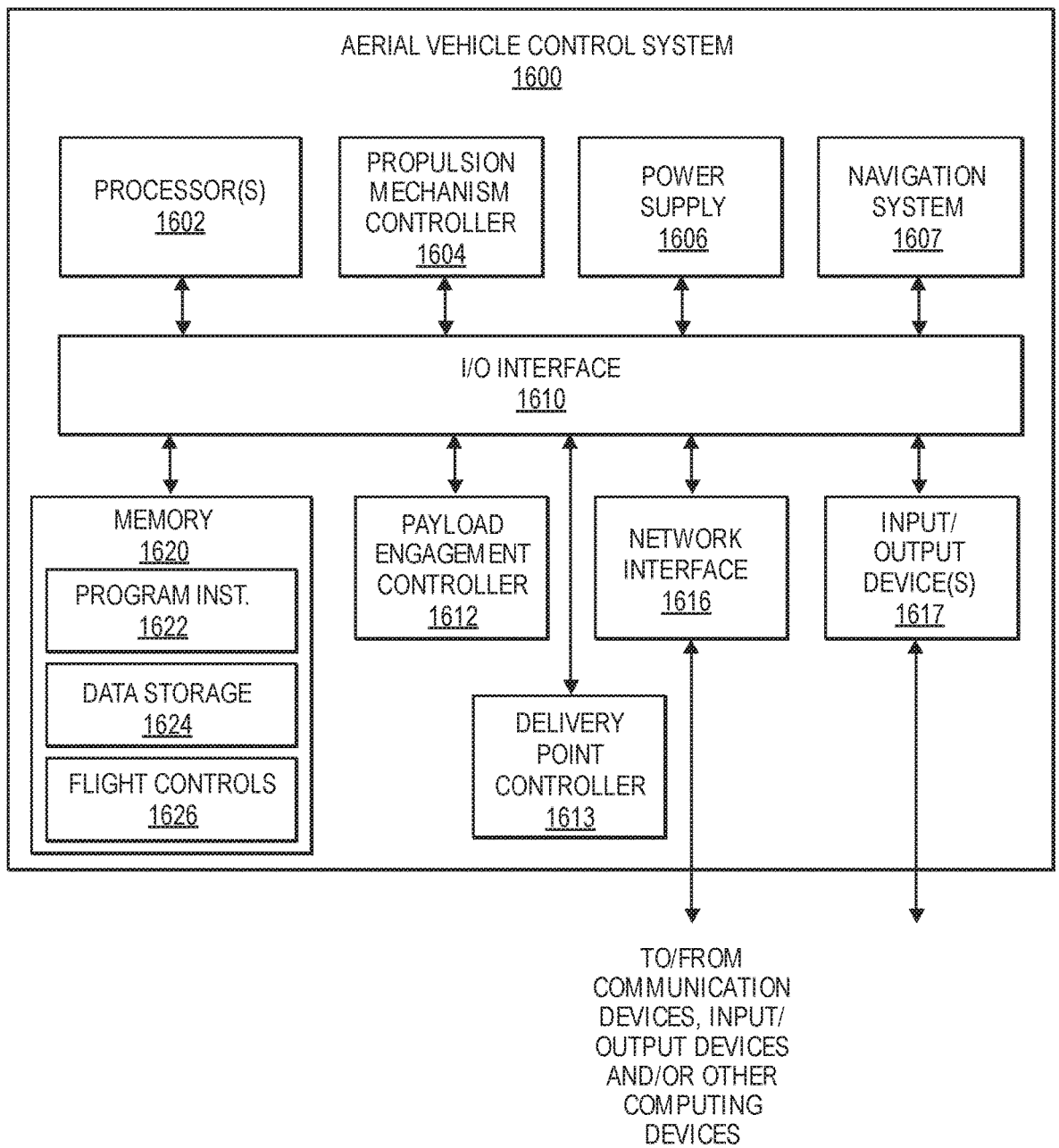
FIG. 16 is an example aerial vehicle control system, in accordance with described implementations.

FIG. 16 is a block diagram illustrating various components of an example aerial vehicle control system 1600, in accordance with disclosed implementations.

In various examples, the block diagram may be illustrative of one or more aspects of the aerial vehicle control system 1600 that may be used to implement the various systems and methods discussed herein and/or to control operation of an aerial vehicle discussed herein. In the illustrated implementation, the aerial vehicle control system 1600 includes one or more processors 1602, coupled to a memory, e.g., a non-transitory computer readable storage medium 1620, via an input/output (I/O) interface 1610. The aerial vehicle control system 1600 also includes propulsion mechanism controllers 1604, such as electronic speed controls (ESCs) or motor controllers, power modules 1606 and/or a navigation system 1607. The aerial vehicle control system 1600 further includes a payload engagement controller 1612, a delivery point controller 1613 configured to implement one or more of the implementations described herein, a network interface 1616, and one or more input/output devices 1617.

In various implementations, the aerial vehicle control system 1600 may be a uniprocessor system including one processor 1602, or a multiprocessor system including several processors 1602 (e.g., two, four, eight, or another suitable number). The processor(s) 1602 may be any suitable processor capable of executing instructions. For example, in various implementations, the processor(s) 1602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1602 may commonly, but not necessarily, implement the same ISA.

The non-transitory computer readable storage medium 1620 may be configured to store executable instructions, data, flight paths, flight control parameters, center of gravity information, and/or data items accessible by the processor(s) 1602. In various implementations, the non-transitory computer readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1620 as program instructions 1622, data storage 1624 and flight controls 1626, respectively. In other implementations, program instructions, data, and/or flight controls may be received, sent, or stored upon different types of computer-accessible media, such as non-transitory media, or on similar media separate from the non-transitory computer readable storage medium 1620 or the aerial vehicle control system 1600. Generally speaking, a non-transitory, computer readable storage medium may include storage media or memory media such as magnetic or optical media, e.g., disk or CD/DVD-ROM, coupled to the aerial vehicle control system 1600 via the I/O interface 1610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1616.

In one implementation, the I/O interface 1610 may be configured to coordinate I/O traffic between the processor(s) 1602, the non-transitory computer readable storage medium 1620, and any peripheral devices, the network interface or other peripheral interfaces, such as input/output devices 1617. In some implementations, the I/O interface 1610 may perform any necessary protocol, timing or other data transformations to convert data signals from one component (e.g., non-transitory computer readable storage medium 1620) into a format suitable for use by another component (e.g., processor(s) 1602). In some implementations, the I/O interface 1610 may include support for devices attached through various types of peripheral buses, such as a variant of the Peripheral Component Interconnect (PCI) bus standard or the Universal Serial Bus (USB) standard, for example. In some implementations, the function of the I/O interface 1610 may be split into two or more separate components, such as a north bridge and a south bridge, for example. Also, in some implementations, some or all of the functionality of the I/O interface 1610, such as an interface to the non-transitory computer readable storage medium 1620, may be incorporated directly into the processor(s) 1602.

The propulsion mechanism controllers 1604 may communicate with the navigation system 1607 and adjust the rotational speed, position, orientation, or other parameters of each propulsion mechanism, to stabilize the aerial vehicle, and/or to perform one or more maneuvers and guide the aerial vehicle along a flight path and/or to a safe landing location.

The navigation system 1607 may include a global positioning system (GPS), indoor positioning system (IPS), or other similar system and/or sensors that can be used to navigate the aerial vehicle to and/or from a location. The payload engagement controller 1612 communicates with the actuator(s) or motor(s) (e.g., a servo motor) used to engage and/or disengage items.

The delivery point controller 1613 may comprise or form a part of a flight controller that is configured to determine flight paths/routes, selected delivery points, and/or to provide other controls and operations of the aerial vehicle. The delivery point controller 1613 may send and/or receive data to/from one or more sensors, such as imaging devices, an inertial measurement unit, accelerometers, gyroscopes, navigation sensors, or other sensors, and/or the delivery point controller 1613 may send and/or receive data to/from propulsion mechanism controllers 1604 associated with respective propulsion mechanisms. In some implementations, the delivery point controller 1613 may be integrated with or form a part of one or more of the processors 1602, the propulsion mechanism controllers 1604, and/or the navigation system 1607.

The network interface 1616 may be configured to allow data to be exchanged between the aerial vehicle control system 1600, other devices attached to a network, such as other computer systems (e.g., remote computing resources), and/or with aerial vehicle control systems of other aerial vehicles. For example, the network interface 1616 may enable wireless communication between the aerial vehicle and an aerial vehicle control system that is implemented on one or more remote computing resources. For wireless communication, an antenna of the aerial vehicle or other communication components may be utilized. As another example, the network interface 1616 may enable wireless communication between numerous aerial vehicles. In various implementations, the network interface 1616 may support communication via wireless general data networks, such as a Wi-Fi network. For example, the network interface 1616 may support communication via telecommunications networks, such as cellular communication networks, satellite networks, and the like.

Input/output devices 1617 may, in some implementations, include one or more displays, imaging devices, thermal sensors, infrared sensors, time of flight sensors, accelerometers, pressure sensors, weather sensors, etc. Multiple input/output devices 1617 may be present and controlled by the aerial vehicle control system 1600. One or more of these sensors may be utilized to implement the implementations described.

As shown in FIG. 16, the memory may include program instructions 1622, which may be configured to implement the example routines and/or sub-routines described herein. The data storage 1624 may include various data stores for maintaining data items that may be provided for aerial vehicle navigation, determining flight paths, landing, determining deliverable area shapes within a parcel, identifying delivery points, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1600 is merely illustrative and is not intended to limit the scope of the present disclosure. In particular, the computing system and devices may include any combination of hardware or software that can perform the indicated functions. The aerial vehicle control system 1600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1600. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1600 may be transmitted to the aerial vehicle control system 1600 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Figure 17:
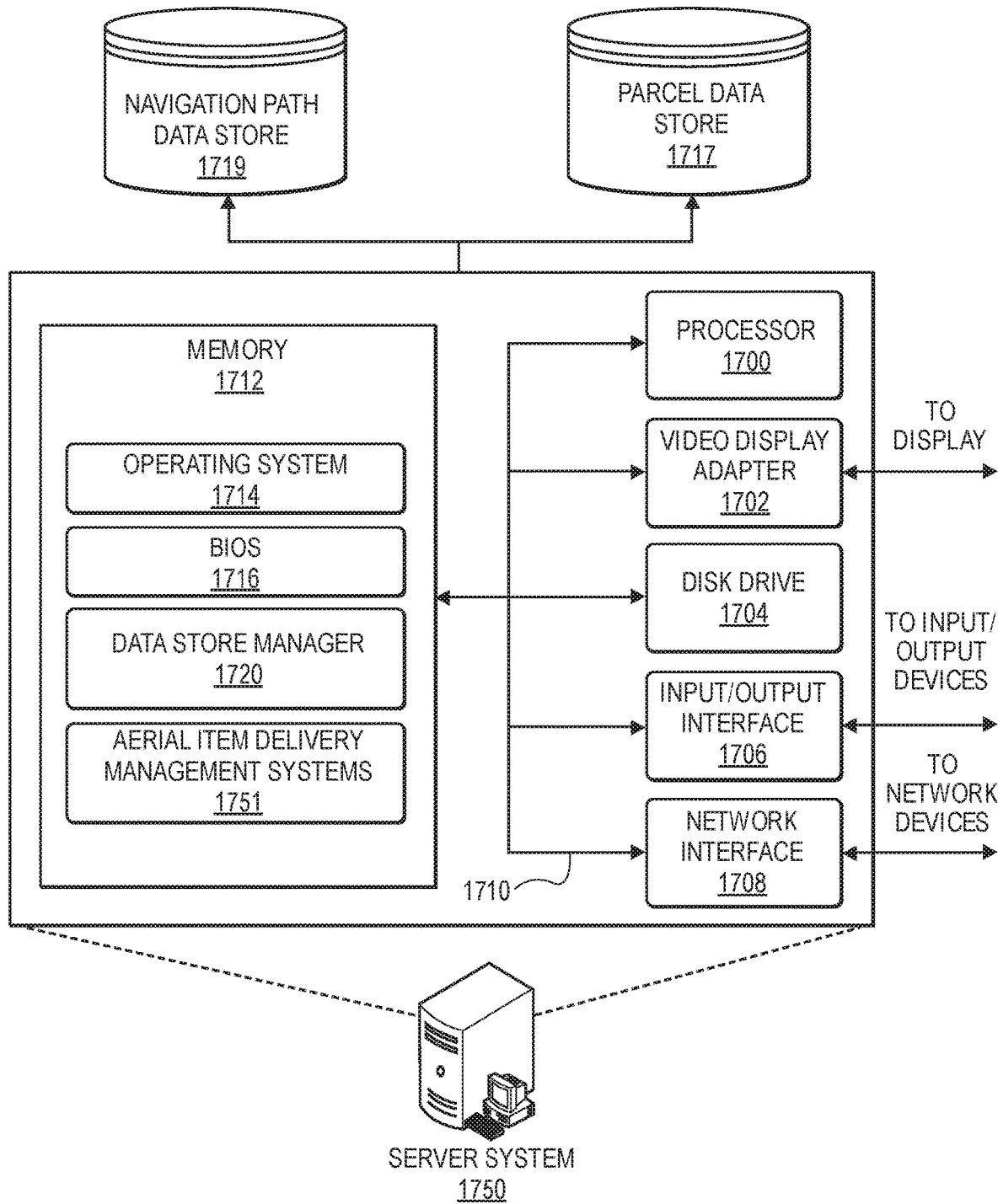
FIG. 17 is an example computing system, in accordance with disclosed implementations.

FIG. 17 is a pictorial diagram of an illustrative implementation of a server system 1750 that may be used in the implementations described herein.

The server system 1750 may include a processor 1700, such as one or more redundant processors, a video display adapter 1702, a disk drive 1704, an input/output interface 1706, a network interface 1708, and a memory 1712. The processor 1700, the video display adapter 1702, the disk drive 1704, the input/output interface 1706, the network interface 1708, and the memory 1712 may be communicatively coupled to each other by a communication bus 1710.

The video display adapter 1702 provides display signals to a local display permitting an operator of the server system 1750 to monitor and configure operation of the server system 1750. The input/output interface 1706 likewise communicates with external input/output devices, such as a mouse, keyboard, scanner, or other input and output devices that can be operated by an operator of the server system 1750. The network interface 1708 includes hardware, software, or any combination thereof, to communicate with other computing devices. For example, the network interface 1708 may be configured to provide communications between the server system 1750 and other computing devices, such as the aerial vehicle control system 1600 (FIG. 16) of an aerial vehicle 1505 (FIG. 15).

The memory 1712 may be a non-transitory computer readable storage medium configured to store executable instructions accessible by the processor(s) 1700. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1708.

The memory 1712 is shown storing an operating system 1714 for controlling the operation of the server system 1750. A binary input/output system (BIOS) 1716 for controlling the low-level operation of the server system 1750 is also stored in the memory 1712. The memory 1712 additionally stores computer executable instructions, that, when executed by the processor 1700 cause the processor to perform one or more of the processes discussed herein. The memory 1712 additionally stores program code and data for providing network services. The data store manager application 1720 facilitates data exchange between the data stores 1717, 1719 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 1750 can include any appropriate hardware and software for integrating with the data stores 1717, 1719 as needed to execute aspects of the management systems 1750.

The data stores 1717, 1719 can include several separate data tables, databases or other data storage mechanisms and media for storing data relating to a particular aspect. For example, the data stores 1717, 1719 illustrated include mechanisms for maintaining navigation path information, parcel data such as deliverable area shapes, parcel locations, etc. Depending on the configuration and use of the server system 1750, one or more of the data stores may not be included or accessible to the server system 1750 and/or other data store may be included or accessible.

It should be understood that there can be many other aspects that may be stored in the data stores 1717, 1719. The data stores 1717, 1719 are operable, through logic associated therewith, to receive instructions from the server system 1750 and obtain, update or otherwise process data in response thereto.

The memory 1712 may also include an aerial item delivery management system 1751. The item delivery management system 1751 may be configured to perform some or all of the implementations discussed herein and/or to exchange data and information with one or more aerial vehicles. For example, the item delivery management system 1751 may perform one or more of the processes discussed above with respect to FIGS. 10-14.

The corresponding server system 1750 may be executable by the processor 1700 to implement one or more of the functions of the server system 1750. In one implementation, the server system 1750 may represent instructions embodied in one or more software programs stored in the memory 1712. In another implementation, the system 1750 can represent hardware, software instructions, or a combination thereof.

The server system 1750, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 17. Thus, the depiction in FIG. 17 should be taken as being illustrative in nature and not limiting to the scope of the disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 10 through 14, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to determine aerial item deliverability to a geographic area, comprising:
    determining a plurality of parcel polygons within the geographic area, each parcel polygon representative of a parcel within the geographic area;
    for each of the plurality of parcel polygons:
        generating a remaining parcel polygon that represents an area of the parcel polygon with a first portion of the area removed, wherein the first portion of the area corresponds to a structure at the parcel;
        selecting a plurality of starting points within the remaining parcel polygon;
        generating, from each of the plurality of starting points, a deliverable area shape within the remaining parcel polygon, wherein each of the deliverable area shapes contact at least one edge of the parcel polygon and at least one edge of the first portion of the area;
        determining if at least one of the deliverable area shapes is larger than a threshold;
        in response to determining that at least one of the deliverable area shapes is larger than the threshold, indicating the parcel polygon as available for aerial item delivery; and
        in response to determining that none of the deliverable area shapes are larger than the threshold, indicating the parcel polygon as not available for aerial item delivery; and
    determining aerial item deliverability for the geographic area based at least in part on a first number of the plurality of parcels indicated as available for aerial item delivery and a second number of the plurality of parcels indicated as not available for aerial item delivery.

2. The computer-implemented method of claim 1, wherein selecting a plurality of starting points, and generating, from each of the plurality of starting points, a deliverable area shape, further includes:
    selecting a first starting point within the remaining parcel polygon;
    generating, from the first starting point, a first deliverable area shape within the remaining parcel polygon, wherein the first deliverable area shape contacts at least one edge of the remaining parcel polygon and at least one edge of the first portion of the area;
    generating a reduced remaining parcel polygon that represents the area of the parcel polygon with the first portion of the area removed and with a second portion of the area removed, wherein the second portion of the area corresponds to the first deliverable area shape;

selecting a second starting point within the reduced remaining parcel polygon;

generating, from the second starting point, a second deliverable area shape within the remaining parcel polygon, wherein:

the second deliverable area shape contacts at least one edge of the parcel polygon and at least one edge of the first portion of the area; and at least a portion of the second deliverable area shape may overlap at least a portion of the first deliverable area shape.

3. The computer-implemented method of claim 1, wherein selecting a plurality of starting points, and generating, from each of the plurality of starting points, a deliverable area shape, further includes:

selecting a first starting point within the remaining parcel polygon;

generating, from the first starting point, a first deliverable area shape within the remaining parcel polygon, wherein the first deliverable area shape contacts at least one edge of the remaining parcel polygon and at least one edge of the first portion of the area;

generating a reduced remaining parcel polygon that represents the area of the parcel polygon with the first portion of the area removed and with a second portion of the area removed, wherein the second portion of the area corresponds to the first deliverable area shape;

selecting a second starting point within the reduced remaining parcel polygon;

generating, from the second starting point, a second deliverable area shape within the reduced remaining parcel polygon, wherein:

the second deliverable area shape contacts at least one edge of the remaining parcel polygon and at least one edge of the first portion of the area; and the second deliverable area shape does not overlap the first deliverable area shape.

4. The computer-implemented method of claim 1, further comprising:

in response to determining that a parcel is available for aerial item delivery, obtaining aerial image data of the parcel; and processing a portion of the image data corresponding to a deliverable area shape that exceeds the threshold, without processing portions of the image data that do not correspond to deliverable area shapes that exceed the threshold to determine at least one of: objects represented in the image data or a color histogram of the image data.

5. The computer-implemented method of claim 4, further comprising:

determining, for the deliverable area shape, a deliverability score, wherein the deliverability score is based at least in part on one or more of objects represented in the image data, image statistics, the color histogram, a size of the deliverable area shape, a shape of the deliverable area shape, or a topology of a portion of the parcel corresponding to the deliverable area shape.

6. The computer-implemented method of claim 1, wherein:

indicating the parcel polygon as available for item delivery includes generating a parcel deliverability score further comprising, the parcel deliverability score indicative of an overall confidence that the parcel is available for aerial item delivery; and determining aerial item deliverability for the geographic area is based at least in part on parcel deliverability scores computed for parcels within the geographic area.

7. A method, comprising:

determining a parcel polygon representative of a parcel;

generating a remaining parcel polygon that represents an area of the parcel polygon with a first portion of the area removed, wherein the first portion of the area corresponds to a structure at the parcel;

selecting a first starting point within the remaining parcel polygon;

generating, from the first starting point, a first deliverable area shape within the remaining parcel polygon, wherein the first deliverable area shape contacts at least one edge of the remaining parcel polygon and at least one edge of the first portion of the area;

selecting a second starting point within the remaining parcel polygon that is different than the first starting point;

generating, from the second starting point, a second deliverable area shape within the remaining parcel polygon, wherein the second deliverable area shape contacts at least one edge of the remaining parcel polygon and at least one edge of the first portion of the area;

determining that at least one of the first deliverable area shape or the second deliverable area shape is larger than a threshold; and in response to determining that at least one of the first deliverable area shape or the second deliverable area shape is larger than the threshold, indicating the parcel as available for aerial item delivery.

8. The method of claim 7, further comprising:

generating a reduced remaining parcel polygon that represents the area of the parcel polygon with the first portion of the area removed and with a second portion of the area corresponding to the first deliverable area shape; and wherein selecting the second starting point includes, selecting the second starting point from within the reduced remaining parcel polygon.

9. The method of claim 8, wherein at least a portion of the second deliverable area shape may overlap at least a portion of the first deliverable area shape.

10. The method of claim 8, wherein generating the second deliverable area shape further includes:

generating, from the second starting point, the second deliverable area shape within the reduced remaining parcel polygon, wherein the second deliverable area shape contacts at least one edge of the reduced remaining parcel polygon, at least one edge of the first portion of the area, and does not overlap the first deliverable area shape.

11. The method of claim 7, further comprising:

determining that the first deliverable area shape exceeds the threshold;

determining that the second deliverable area shape does not exceed the threshold;

obtaining aerial image data of the parcel polygon; and processing a portion of the aerial image data corresponding to the first deliverable area shape, without processing portions of the aerial image data that correspond to only the second deliverable area shape, to determine at least one of: objects represented in the aerial image data or a color histogram of the image data.

12. The method of claim 7, further comprising:
selecting a third starting point within the remaining parcel polygon that is different than the first point and the second starting point;
generating, from the third starting point, a third deliverable area shape within the remaining parcel polygon, wherein the third deliverable area shape contacts at least one edge of the remaining parcel polygon and at least one edge of the first portion of the area;
determining that the first deliverable area shape and the second deliverable area shape exceed the threshold;
determining that the third deliverable area shape does not exceed the threshold;
obtaining aerial image data representative of the parcel;
processing a first portion of the image data corresponding to the first deliverable area shape, without processing portions of the image data corresponding only to the third deliverable area shape, to determine at least one of: first objects represented in the first portion of the image data or a first color histogram of the first portion of the image data;
determining, for the first deliverable area shape, a first deliverability score, wherein the first deliverability score is based at least in part on one or more of the first objects represented in the first portion of the image data, first image statistics, the first color histogram, a first area of the first deliverable area shape, a first deliverable area shape of the first deliverable area shape, or a first topology of the first portion of the parcel corresponding to the first deliverable area shape;
processing a second portion of the image data corresponding to the second deliverable area shape, without processing portions of the image data corresponding only to the third deliverable area shape, to determine at least one of: second objects represented in the second portion of the image data or a second color histogram of the second portion of the image data;
determining, for the second deliverable area shape, a second deliverability score, wherein the second deliverability score is based at least in part on one or more of the second objects represented in the second portion of the image data, second image statistics, the second color histogram, a second area of the second deliverable area shape, a second deliverable area shape of the second deliverable area shape, or a second topology of the second portion of the parcel corresponding to the second deliverable area shape; and
ranking the first deliverable area shape and the second deliverable area shape based at least in part on the first deliverability score and the second deliverability score.

13. The method of claim 12, further comprising:
causing an aerial vehicle to aerially deliver an item to the parcel;
confirm that the item was delivered to a delivery point within the first deliverable area shape; and
increase the first deliverability score to indicate delivery of the item to the delivery point within the first deliverable area shape.

14. The method of claim 12, further comprising:
causing an aerial vehicle to aerially deliver an item to the parcel;
determine that the aerial vehicle was not able to deliver the item to a first delivery point within the first deliverable area shape;
confirm that the item was delivered to a second delivery point within the second deliverable area shape;
decrease the first deliverability score in response to determining that the aerial vehicle was not able to deliver the item to the first delivery point within the first deliverable area shape; and
increase the second deliverability score to indicate delivery of the item to the second delivery point within the second deliverable area shape.

15. The method of claim 7, wherein the first deliverable area shape is at least one of a circle, a square, an ellipse, or a rectangle.

16. A system, comprising:
one or more processors; and
a memory storing program instructions that when executed by the one or more processors cause the one or more processors to at least:
determine a parcel polygon representative of a parcel to which aerial item delivery availability is to be determined;
generate a remaining parcel polygon that represents an area of the parcel polygon with a first portion of the area removed, wherein the first portion of the area corresponds to a structure at the parcel;
selecting a first starting point within the remaining parcel polygon;
generating, from the first starting point, a first deliverable area shape within the remaining parcel polygon, wherein the first deliverable area shape contacts at least a portion of a perimeter of the remaining parcel polygon and at least a portion of a perimeter of the first portion of the area;
selecting a second starting point within the remaining parcel polygon that is different than the first point;
generating, from the second starting point, a second deliverable area shape within the remaining parcel polygon wherein the second deliverable area shape contacts at least a portion of the perimeter of the remaining parcel polygon and at least a portion of a perimeter of the first portion of the area;
determining that at least one of the first deliverable area shape or the second deliverable area shape is larger than a threshold; and
in response to determining that at least one of the first deliverable area shape or the second deliverable area shape is larger than the threshold, indicating the parcel as available for aerial item delivery.

17. The system of claim 16, wherein the deliverable area shape is at least one of a polygon, a circle, or an ellipse.

18. The system of claim 16, wherein the program instructions that when executed by the one or more processors further cause the one or more processors to at least:
determine that the first deliverable area shape exceeds the threshold;
determine that the second deliverable area shape does not exceed the threshold;
obtain aerial image data of the parcel polygon;
process a portion of the aerial image data corresponding to the first deliverable area shape, without processing portions of the aerial image data that correspond to only the second deliverable area shape, to determine an object represented in the aerial image data;
generate a modified first deliverable area shape that represents the area of the first deliverable area shape with first portion of the area removed;
determine that the modified first deliverable area shape does not exceed the threshold; and
indicate the first parcel as not available for aerial item delivery.

19. The system of claim 16, wherein the program instructions when executed by the one or more processors further cause the one or more processors to at least:
- cause an aerial vehicle to aerially navigate with an item to the parcel;
- instruct the aerial vehicle to deliver the item to a delivery point within the first deliverable area shape;
- confirm that the item was delivered to the delivery point within the first deliverable area shape; and
- increase a deliverability score to indicate delivery of the item to the delivery point within the first deliverable area shape.

20. The system of claim 16, wherein the program instructions that when executed by the one or more processors further cause the one or more processors to at least:
- cause an aerial vehicle to aerially navigate with an item to the parcel;
- instruct the aerial vehicle to deliver the item to a delivery point within the first deliverable area shape;
- determine that the aerial vehicle was not able to deliver the item to the delivery point within the first deliverable area shape;
- determine that the aerial vehicle was not able to deliver the item based at least in part on a detection of a moving object within the first deliverable area shape; and
- maintain a first deliverability score in response to a determination that the aerial vehicle was not able to deliver the item to the first delivery point within the first polygon due to a detection of a moving object within the first deliverable area shape.

* * * * *